US012190785B2

(12) United States Patent
Zhai et al.

(10) Patent No.: US 12,190,785 B2
(45) Date of Patent: Jan. 7, 2025

(54) DISPLAY PANEL AND DISPLAY DEVICE

(71) Applicant: Tianma Advanced Display Technology Institute (Xiamen) Co., Ltd., Xiamen (CN)

(72) Inventors: Yingteng Zhai, Xiamen (CN); Tianyi Wu, Xiamen (CN); Feng Qin, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/205,752

(22) Filed: Jun. 5, 2023

(65) Prior Publication Data

US 2023/0316987 A1 Oct. 5, 2023

(30) Foreign Application Priority Data

Dec. 26, 2022 (CN) ......................... 202211677798.4

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0842* (2013.01); *G09G 2300/0861* (2013.01); *G09G 2310/08* (2013.01)

(58) Field of Classification Search
CPC ............... G09G 3/2096; G09G 3/3233; G09G 2300/0819; G09G 2300/0842; G09G 2300/0861; G09G 2310/08; G09G 3/32; G09G 3/20; G09G 3/3208; G09G 3/3266; G09G 3/3291
See application file for complete search history.

(56) References Cited

U.S. PATENT DOCUMENTS

| | | | | |
|---|---|---|---|---|
| 11,195,459 B2 * | 12/2021 | Kobayashi | ........... | G09G 3/3266 |
| 11,367,393 B2 * | 6/2022 | Yana | .................... | G09G 3/3233 |
| 11,521,557 B2 * | 12/2022 | Soda | ...................... | H10K 59/65 |
| 11,869,423 B2 * | 1/2024 | Gao | ..................... | G09G 3/3233 |
| 2014/0084805 A1 * | 3/2014 | Kim | ..................... | G09G 3/2048<br>315/240 |
| 2020/0402458 A1 * | 12/2020 | Gao | ..................... | G09G 3/3233 |
| 2020/0410933 A1 * | 12/2020 | Kobayashi | ........... | G09G 3/3233 |

FOREIGN PATENT DOCUMENTS

| | | |
|---|---|---|
| CN | 101059932 A | 10/2007 |
| CN | 102063861 A | 5/2011 |

* cited by examiner

*Primary Examiner* — Mihir K Rayan
(74) *Attorney, Agent, or Firm* — KDW Firm PLLC

(57) ABSTRACT

Provided are a display panel and a display device. The display panel includes a pixel circuit and a light-emitting element. The pixel circuit includes a data write module, a drive module and a first reset module. The data write module is configured to transmit a data signal in response to a scan signal of a first scan terminal. The drive module is configured to provide a drive current for the light-emitting element and includes a drive transistor. The drive transistor is configured to generate the drive current according to the data signal. The first reset module is connected between a first signal line and a gate of the drive transistor and configured to transmit a signal of the first signal line to the gate of the drive transistor. The data write module is connected between the first signal line and an input terminal of the drive transistor.

20 Claims, 17 Drawing Sheets

DISPLAY PANEL AND DISPLAY DEVICE

CROSS-REFERENCE TO RELATED APPLICATION

This application claims priority to Chinese Patent Application No. 202211677798.4 filed Dec. 26, 2022, the disclosure of which is incorporated herein by reference in its entirety.

TECHNICAL FIELD

The present disclosure relates to the field of display technology and, in particular, to a display panel and a display device.

BACKGROUND

In a display panel, a pixel circuit provides a light-emitting element of the display panel with a drive current required for display and controls whether the light-emitting element enters a light emission stage. Therefore, the pixel circuit is an indispensable element in most self-luminous display panels.

However, in an existing display panel, the number of signal lines required for a pixel circuit is very large so that a layout size and area of the pixel circuit in the display panel cannot be further reduced.

SUMMARY

The present disclosure provides a display panel and a display device to reduce the number of signal lines in a pixel circuit.

In one aspect of the present disclosure, a display panel is provided. The display panel includes a pixel circuit and a light-emitting element.

The pixel circuit includes a data write module, a drive module and a first reset module.

The data write module is configured to transmit a data signal in response to a scan signal of a first scan terminal.

The drive module is configured to provide a drive current for the light-emitting element and includes a drive transistor, where the drive transistor is configured to generate the drive current according to the data signal transmitted by the data write module.

The first reset module is connected between a first signal line and a gate of the drive transistor and configured to transmit a signal of the first signal line to the gate of the drive transistor.

The data write module is connected between the first signal line and an input terminal of the drive transistor.

In another aspect of the present disclosure, a display device is provided. The display device includes the above display panel.

In an embodiment of the present disclosure, the data write module is connected between the first signal line and the input terminal of the drive transistor, and the first reset module is connected between the first signal line and the gate of the drive transistor; the first signal line also serves as a data signal line and a reference voltage line, the data write module transmits the data signal provided by the first signal line in response to the scan signal of the first scan terminal, and the first reset module transmits a first reset signal provided by the first signal line when the first reset module is turned on. In the embodiment of the present disclosure, since the first signal line, which is used as the data signal line, also serves as the reference voltage line, a separate reference voltage line does not need to be disposed in the display panel so that the number of signal lines in the display panel is reduced and a layout size of the pixel circuit can be reduced, which is conducive to improving a resolution of the display panel or improving a transmittance of the display panel.

It is to be understood that the content described in this part is neither intended to identify key or important features of embodiments of the present disclosure nor intended to limit the scope of the present disclosure. Other features of the present disclosure become easily understood through the description hereinafter.

BRIEF DESCRIPTION OF DRAWINGS

To illustrate technical solutions in embodiments of the present disclosure more clearly, drawings used in description of the embodiments will be briefly described below. Apparently, the drawings described below illustrate part of the embodiments of the present disclosure, and those of ordinary skill in the art may obtain other drawings based on the drawings described below on the premise that no creative work is done.

DETAILED DESCRIPTION

Technical schemes in embodiments of the present disclosure are described clearly and completely in conjunction with drawings in embodiments of the present disclosure from which schemes of the present disclosure are better understood by those skilled in the art. Apparently, the embodiments described below are part, not all, of embodiments of the present disclosure. Based on embodiments of the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used for distinguishing between similar objects and are not necessarily used for describing a particular order or sequence. It should be understood that the data used in this manner is interchangeable in appropriate cases so that embodiments of the present disclosure described here can be implemented in an order not illustrated or described here. In addition, terms "comprising", "including" and any other variation thereof are intended to encompass a non-exclusive inclusion. For example, a process, method, system, product or device that includes a series of steps or units not only includes the expressly listed steps or units, but may also include other steps or units that are not expressly listed or are inherent to such a process, method, product or device.

Figure 1:
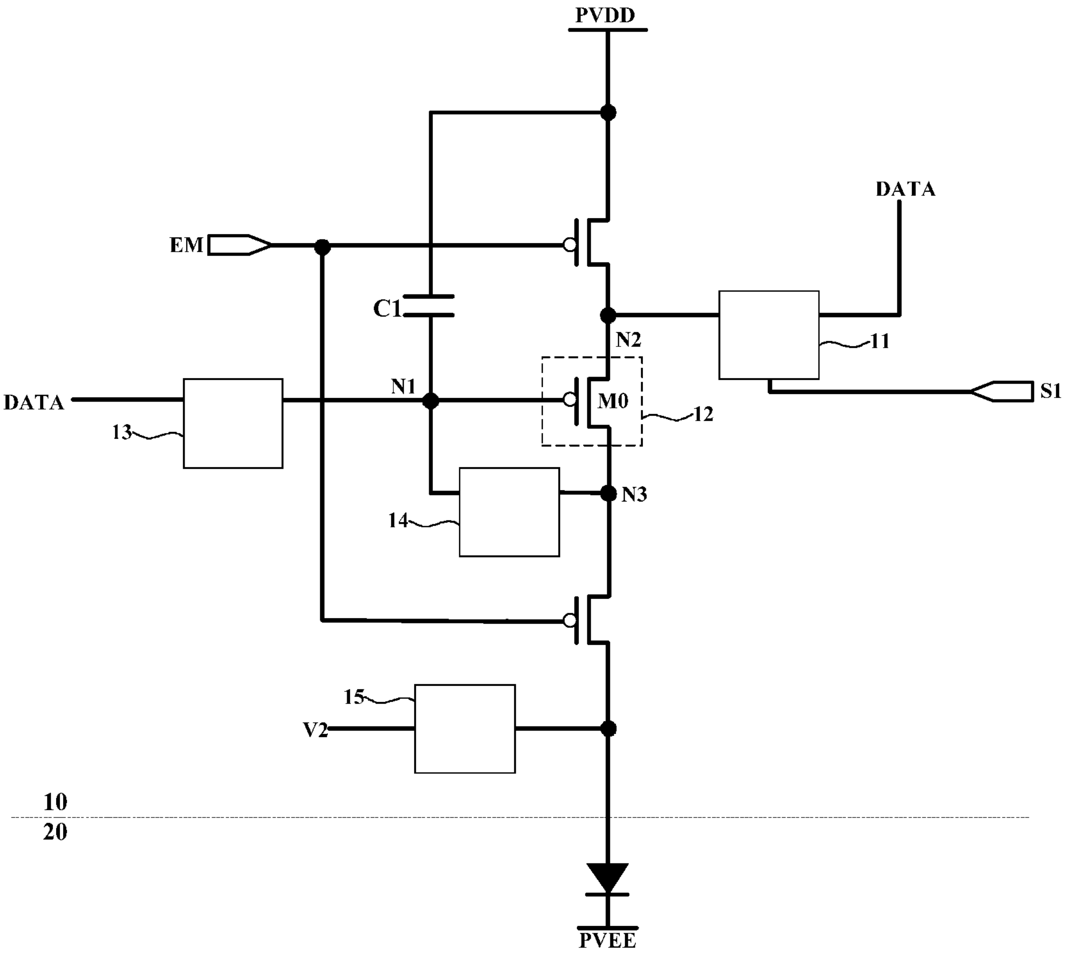
FIG. 1 is a schematic diagram of a pixel circuit according to an embodiment of the present disclosure.

FIG. 1 is a schematic diagram of a pixel circuit according to an embodiment of the present disclosure. As shown in FIG. 1, a display panel provided in the present embodiment includes a pixel circuit 10 and a light-emitting element 20. The pixel circuit 10 includes a data write module 11, a drive module 12 and a first reset module 13. The data write module 11 is configured to transmit a data signal in response to a scan signal of a first scan terminal S1. The drive module 12 is configured to provide a drive current for the light-emitting element 20 and includes a drive transistor M0, where the drive transistor M0 is configured to generate the drive current according to the data signal transmitted by the data write module 11. The first reset module 13 is connected between a first signal line DATA and a gate of the drive transistor M0 and configured to transmit a signal of the first signal line DATA to the gate of the drive transistor M0. The data write module 11 is connected between the first signal line DATA and an input terminal of the drive transistor M0.

It is to be noted that FIG. 1 illustrates only the key structures of the preceding embodiment and does not include all the structures operating in the circuit. The complete circuit structure is gradually shown in the following with the description in this embodiment.

In the present embodiment, the pixel circuit 10 includes the data write module 11, where the data write module 11 is configured to transmit the data signal in response to the scan signal of the first scan terminal S1. An input terminal of the data write module 11 is connected to the first signal line DATA, a control terminal of the data write module 11 is connected to the first scan terminal S1, and an output terminal of the data write module 11 is connected to an input terminal N2 of the drive module 12. The first signal line DATA provides the signal, and the first scan terminal S1 controls the data write module 11 to turn on or off. When the data write module 11 is turned on, the signal provided by the first signal line DATA is transmitted to the input terminal N2 of the drive module 12 through the data write module 11, for example, the signal provided by the first signal line DATA is a data signal, and the data signal is transmitted to the input terminal N2 of the drive module 12 through the data write module 11. The first scan terminal S1 provides the scan signal, and the scan signal is a pulse signal. When the scan signal provided by the first scan terminal S1 is an effective pulse, a transmission path of the input terminal and the output terminal of the data write module 11 is conductive, and the data signal provided by the first signal line DATA is transmitted to the input terminal N2 of the drive module 12; and when the scan signal provided by the first scan terminal S1 is an ineffective pulse, the transmission path of the input terminal and the output terminal of the data write module 11 is not conductive, and the signal provided by the first signal line DATA cannot be transmitted to the input terminal N2 of the drive module 12. Therefore, the data write module 11 transmits the data signal in response to the scan signal of the first scan terminal S1.

The pixel circuit 10 includes the drive module 12, where the drive module 12 is configured to provide the drive current for the light-emitting element 20, the input terminal N2 of the drive module 12 is connected to at least the output terminal of the data write module 11, and an output terminal N3 of the drive module 12 and the light-emitting element 20 are connected in series. The drive module 12 includes the drive transistor M0, where the drive transistor M0 provides the drive current for the light-emitting element 20 according to the data signal transmitted by the data write module 11. A source of the drive transistor M0 is electrically connected to the input terminal N2 of the drive module 12, and a drain of the drive transistor M0 is electrically connected to the output terminal N3 of the drive module 12. In other embodiments, optionally, the drain of the drive transistor is electrically connected to the input terminal of the drive module and the source of the drive transistor is electrically connected to the output terminal of the drive module. It is understandable that the source and the drain of the transistor are not constant but will change as a drive state of the transistor changes.

The pixel circuit 10 includes the first reset module 13, where an input terminal of the first reset module 13 is connected to the first signal line DATA, an output terminal of the first reset module 13 is connected to a control terminal N1 of the drive module 12, and the gate of the drive transistor M0 is connected to the control terminal N1 of the drive module 12. The first signal line DATA provides the signal, and when the first reset module 13 is turned on, the signal provided by the first signal line DATA is a first reset signal. The first reset signal is transmitted to the gate N1 of the drive transistor M0 through the first reset module 13, so as to reset the gate of the drive transistor M0.

As described above, the first signal line DATA is separately connected to the data write module 11 and the first reset module 13. The first signal line DATA, which is used as a data signal line, is configured to provide the data signal when the data write module 11 is turned on, and the data write module 11 transmits the data signal in response to the scan signal of the first scan terminal S1 to write the data signal. The first signal line DATA, which also serves as a reference voltage line, is configured to provide the first reset signal when the first reset module 13 is turned on, and the first reset module 13 transmits the first reset signal to reset the gate of the drive transistor M0, where the first reset signal is a reset voltage.

In the related art, a pixel circuit includes a separate data signal line and reference voltage line, where the data signal line provides a data signal so that a data write module transmits the data signal, and the reference voltage line provides a reset voltage, which is transmitted to a gate of a drive transistor. Compared with the related art, in the present embodiment, the first signal line DATA also serves as the data signal line and the reference voltage line so that the number of signal lines required by the pixel circuit is reduced.

In the embodiment of the present disclosure, the data write module is connected between the first signal line and the input terminal of the drive transistor, and the first reset module is connected between the first signal line and the gate of the drive transistor; the first signal line also serves as the data signal line and the reference voltage line, the data write module transmits the data signal provided by the first signal line in response to the scan signal of the first scan terminal, and the first reset module transmits the first reset signal provided by the first signal line when the first reset module is turned on. In the embodiment of the present disclosure, since the first signal line, which is used as the data signal line, also serves as the reference voltage line, a separate reference voltage line does not need to be disposed in the display panel so that the number of signal lines in the display panel is reduced and a layout size/area of the pixel circuit can be reduced, which is conducive to improving a resolution of the display panel or improving a transmittance of the display panel, thereby enabling the display panel to be applied to the transparent display.

Figure 2:
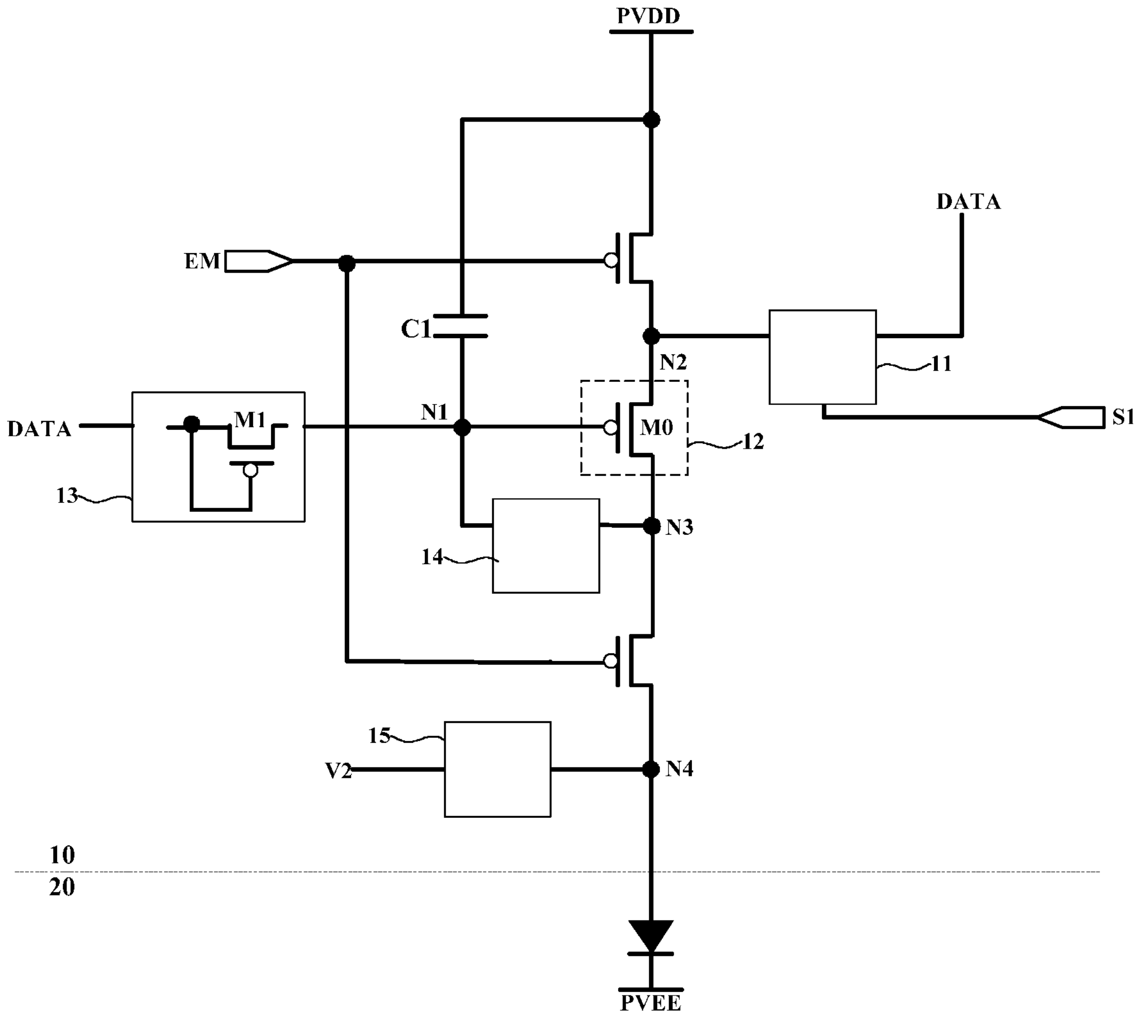
FIG. 2 is a schematic diagram of another pixel circuit according to an embodiment of the present disclosure.

FIG. 2 is a schematic diagram of another pixel circuit according to an embodiment of the present disclosure. As shown in FIG. 2, optionally, the first reset module 13 includes a first reset transistor M1, where a gate of the first reset transistor M1 is connected to an input terminal of the first reset transistor M1. Optionally, both the first reset transistor M1 and the drive transistor M0 are p-type transistors.

In the present embodiment, the gate of the first reset transistor M1 is connected to the input terminal of the first reset transistor M1, that is, the first reset transistor M1 is applied as a diode to the first reset module 13. The first reset module 13 is connected between the first signal line DATA and the gate N1 of the drive transistor M0, then the input terminal of the first reset transistor M1 used as the diode is coupled to the first signal line DATA, an output terminal of the first reset transistor M1 is coupled to the gate N1 of the drive transistor M0, the signal provided by the first signal line DATA can control an on or off state of the first reset transistor M1, and the first reset transistor M1 is configured to transmit the signal provided by the first signal line DATA in response to the signal control of the first signal line DATA. In this manner, the first signal line DATA also serves as a scan signal line of the gate of the first reset transistor M1 so that a scan signal line of the first reset transistor M1 does not need to be disposed in the display panel, the number of scan signal lines in the display panel can be reduced and a driver circuit (such as a scanning shift register) in the display panel which is connected to an original scan signal line and configured to provide a signal for the scan signal line is omitted. In this manner, a bezel size of the display panel can be reduced while the layout area of the pixel circuit is reduced, thereby achieving a narrow bezel of the display panel.

Generally, the reset voltage transmitted to the gate of the drive transistor is a relatively low voltage, and the data signal transmitted to the input terminal of the drive transistor is a relatively high voltage. Based on this, in the present embodiment, it can be designed that the low voltage controls the first reset transistor M1 to turn on and, correspondingly, the high voltage controls the first reset transistor M1 to cut off. Then, optionally, the first signal line DATA provides the low voltage as the first reset signal and the high voltage as the data signal, but it is not limited to this. In other embodiments, optionally, a high level controls the first reset transistor to turn on and a low level controls the first reset transistor to cut off. Therefore, when the first signal line DATA provides the low voltage as the first reset signal, the first reset transistor M1 is controlled to turn on, and when the first signal line DATA provides the high voltage as the data signal, the first reset transistor M1 can be controlled to cut off, thereby ensuring that the data signal will not be input to the gate N1 of the drive transistor M0 through the first reset transistor M1.

The first scan terminal S1 separately controls an on or off state of the data write module 11. When the data signal provided by the first signal line DATA is a data signal required by the present pixel circuit 10, the scan signal provided by the first scan terminal S1 is the effective pulse, which can control the data write module 11 to turn on. When the data signal provided by the first signal line DATA is not the data signal required by the present pixel circuit 10, the scan signal provided by the first scan terminal S1 is the ineffective pulse, which can control the data write module 11 to block, thereby ensuring that data signals of other pixel circuits do not affect the display of the present pixel circuit 10.

Based on this, the first signal line DATA and the first scan terminal S1 cooperate to work. The diode design of the first reset transistor M1 can ensure that the data signal will not be transferred to the gate N1 of the drive transistor M0, and the first scan terminal S1 separately controls the on or off of the data write module 11 to ensure that the data signals of the other pixel circuits will not be transferred to the input terminal N2 of the drive transistor M0 of the present pixel circuit 10.

Figure 3:
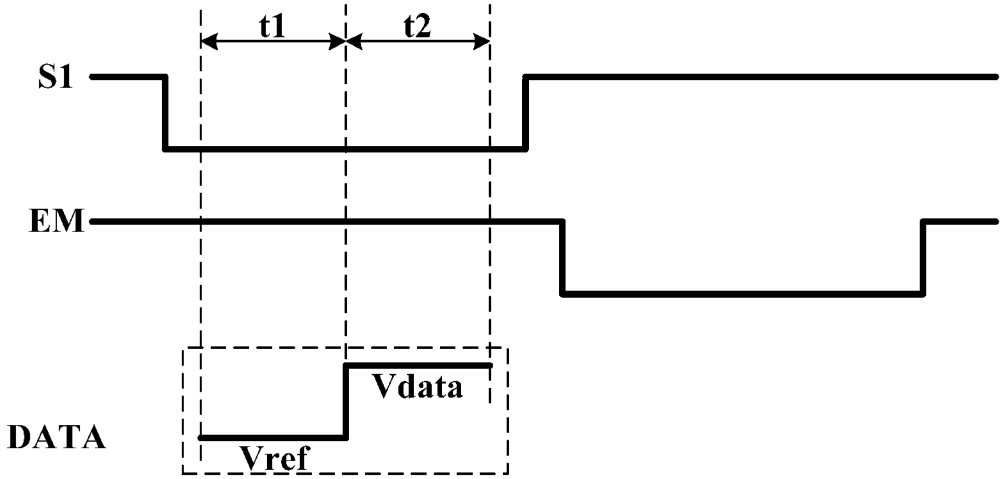
FIG. 3 is a timing diagram of the pixel circuit in FIG. 2.

FIG. 3 is a timing diagram of the pixel circuit in FIG. 2. As shown in FIG. 3, optionally, a working process of the pixel circuit 10 includes a first reset stage and a data write stage. At the first reset stage, the first signal line DATA provides a first reset signal. At the data write stage, the first signal line DATA provides the data signal. It is to be noted that FIG. 3 illustrates only the key timing of the preceding embodiment, including at least the first scan terminal S1, a light emission control terminal EM and the first signal line DATA, and not including the timing of all the signal lines operating in the circuit. The other timing may be gradually shown in the following with the description of this embodiment.

In the present embodiment, at the first reset stage t1, the first signal line DATA provides the first reset signal Vref, and a voltage of the first reset signal Vref is relatively low, then in the case where the first reset transistor M1 using a diode connection manner is a p-type transistor, the first reset signal Vref may control the first reset transistor M1 to turn on so that the first reset transistor M1 transmits the first reset signal Vref to the gate N1 of the drive transistor M0. At the data write stage t2, the first signal line DATA provides the data signal Vdata, and a voltage of the data signal Vdata is greater than a voltage of the first reset signal Vref, then in the case where the first reset transistor M1 using the diode connection manner is the p-type transistor, the data signal Vdata may control the first reset transistor M1 to cut off so that the data signal Vdata will not be transmitted to the gate N1 of the drive transistor M0 through the first reset transistor M1.

Optionally, a voltage of the data signal Vdata is greater than a voltage of the first reset signal Vref. Then, in the case where the first reset transistor M1 using the diode connection manner is the p-type transistor, the first reset signal Vref may control the first reset transistor M1 to turn on, and the data signal Vdata may control the first reset transistor M1 to cut off. Based on this, the data signal Vdata provided by the first signal line DATA will not be transmitted to the gate N1 of the drive transistor M0 through the first reset transistor M1.

Optionally, an enable period of the scan signal of the first scan terminal S1 includes the first reset stage t1 and the data write stage t2.

The enable period of the scan signal of the first scan terminal S1 is an effective pulse, and at the enable period, the first scan terminal S1 controls the data write module 11 to turn on. A non-enable period of the scan signal of the first scan terminal S1 is an ineffective pulse, and at the non-enable period, the first scan terminal S1 controls the data write module 11 to cut off. The enable period of the scan signal of the first scan terminal S1 includes the first reset stage t1 and the data write stage t2. Optionally, the first reset transistor M1 is the p-type transistor.

At the first reset stage t1, the first signal line DATA provides the first reset signal Vref, and the voltage of the first reset signal Vref is relatively low so that the first reset transistor M1 may be controlled to turn on; at the same time, the data write module 11 remains on, then the first reset signal Vref is transmitted to the gate N1 of the drive transistor M0 through the first reset transistor M1; at the same time, the first reset signal Vref is also transmitted to the input terminal N2 of the drive transistor M0 (i.e., the source of the drive transistor M0) through the data write module 11. Thus, the drive transistor M0 is reset, and a bias state of the drive transistor M0 can also be adjusted.

At the data write stage t2, the first signal line DATA provides the data signal Vdata, and the voltage of the data signal Vdata is greater than the voltage of the first reset signal Vref so that the data signal Vdata may control the first reset transistor M1 to cut off, then the data signal Vdata will not be transmitted to the gate N1 of the drive transistor M0 through the first reset transistor M1; while the data write module 11 remains on, then the data signal Vdata may be transmitted to the input terminal N2 of the drive transistor M0 (i.e., the source of the drive transistor M0) through the data write module 11. Thus, the data writing to the drive transistor M0 is achieved.

In other embodiments, optionally, both the first reset transistor and the drive transistor are n-type transistors. Then, the first reset signal provided by the first signal line at the first reset stage is a high voltage, and the data signal provided by the first signal line at the data write stage is less than the first reset signal. In the case where the first reset transistor uses the diode connection manner, the first reset signal may control the first reset transistor to turn on, and the data signal may control the first reset transistor to cut off. The drive transistor is an n-type transistor so that the drain of the drive transistor is electrically connected to the output terminal of the data write module, the source of the drive transistor is coupled to the light-emitting element and the gate of the drive transistor is electrically connected to the output terminal of the first reset module. It is understandable that the source and the drain of the transistor are not constant but will change as the drive state of the transistor changes.

As shown in FIG. 2, optionally, the first reset module 13 includes the first reset transistor M1, and the gate of the first reset transistor M1 is connected to the input terminal of the first reset transistor M1. Optionally, both the first reset transistor M1 and the drive transistor M0 are p-type transistors.

Figure 4:
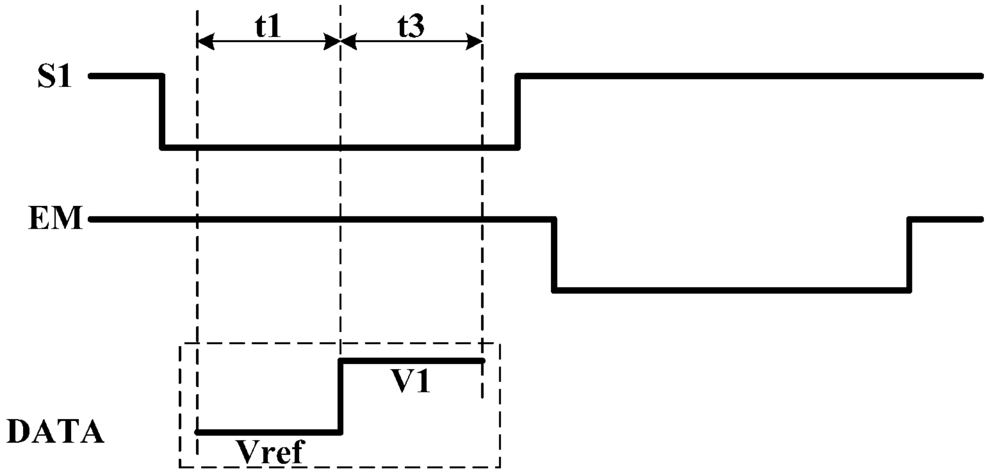
FIG. 4 is another timing diagram of the pixel circuit in FIG. 2.

FIG. 4 is another timing diagram of the pixel circuit in FIG. 2. As shown in FIG. 4, optionally, a working process of the pixel circuit 10 includes a first reset stage t1 and a first non-reset stage t3. At the first reset stage t1, the first signal line DATA provides a first reset signal Vref, and the first reset transistor M1 is turned on. At the first non-reset stage t3, the first signal line DATA provides a first signal V1, and the first reset transistor M1 is turned off.

In the present embodiment, at the first reset stage t1, the first signal line DATA provides the first reset signal Vref, and a voltage of the first reset signal Vref is relatively low, then in the case where the first reset transistor M1 using the diode connection manner is a p-type transistor, the first reset signal Vref may control the first reset transistor M1 to turn on so that the first reset transistor M1 transmits the first reset signal Vref to the gate N1 of the drive transistor M0. At the first non-reset stage t3, the first signal line DATA provides the first signal V1, and a voltage of the first signal V1 is greater than a voltage of the first reset signal Vref, then in the case where the first reset transistor M1 using the diode connection manner is a p-type transistor, the first signal V1 may control the first reset transistor M1 to cut off so that the first signal V1 will not be transmitted to the gate N1 of the drive transistor M0 through the first reset transistor M1. Optionally, the first non-reset stage t3 is the data write stage, and then the first signal V1 may be the data signal.

In other embodiments, optionally, the first signal line may provide three types of signals in sequence, the three types of signals are the first reset signal, the first signal and the data signal, respectively, and the first reset stage and the data write stage may be different stages. The first signal line provides the first reset signal, and the first reset signal may control the first reset transistor to turn on so that the first reset transistor transmits the first reset signal to the gate of the drive transistor, so as to reset the gate of the drive transistor. The first signal line provides the first signal, and the first signal may control the first reset transistor to cut off so that the first signal will not be transmitted to the gate of the drive transistor through the first reset transistor and does not interfere with or affect the reset of the gate of the drive transistor. The first signal line provides the data signal, and the data signal may control the first reset transistor to cut off so that the data signal will not be transmitted to the gate of the drive transistor through the first reset transistor and does not interfere with or affect the reset of the gate of the drive transistor.

Figure 5:
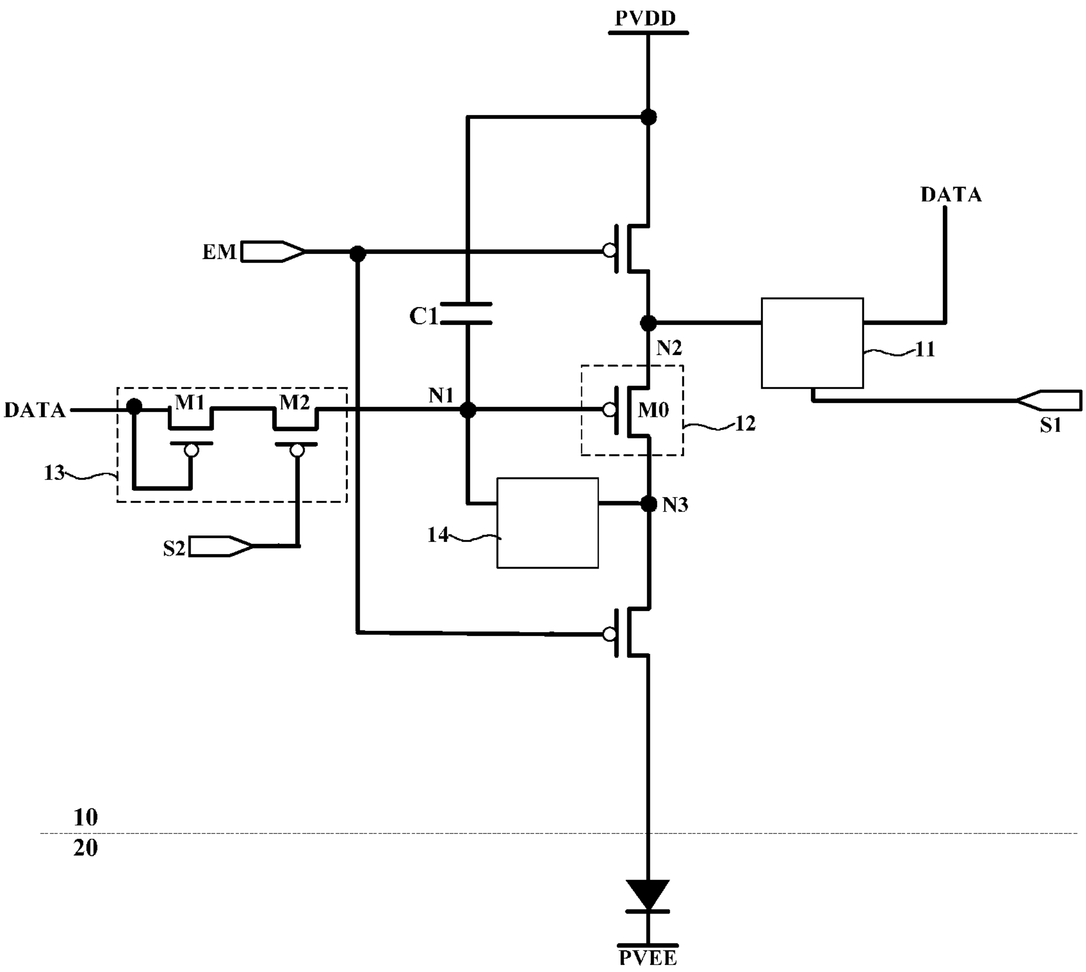
FIG. 5 is a schematic diagram of another pixel circuit according to an embodiment of the present disclosure.

FIG. 5 is a schematic diagram of another pixel circuit according to an embodiment of the present disclosure. As shown in FIG. 5, optionally, the first reset module 13 includes a first reset transistor M1, and a gate of the first reset transistor M1 is connected to an input terminal of the first reset transistor M1. Optionally, the first reset module 13 further includes a second reset transistor M2, the second reset transistor M2 and the first reset transistor M1 are connected in series, and a gate of the second reset transistor M2 is connected to a second scan terminal S2. Optionally, the input terminal of the first reset transistor M1 is connected to the first signal line DATA, an output terminal of the first reset transistor M1 is connected to an input terminal of the second reset transistor M2 and an output terminal of the second reset transistor M2 is connected to the gate N1 of the drive transistor M0. Optionally, both the first reset transistor M1 and the drive transistor M0 are p-type transistors.

In the present embodiment, the gate of the first reset transistor M1 is connected to the input terminal of the first reset transistor M1, that is, the first reset transistor M1 is applied as a diode to the first reset module 13, and the gate of the second reset transistor M2 is connected to the second scan terminal S2. The first reset module 13 is connected between the first signal line DATA and the gate N1 of the drive transistor M0, and optionally, the input terminal of the first reset transistor M1 used as the diode is coupled to the first signal line DATA, the output terminal of the first reset transistor M1 is coupled to the input terminal of the second reset transistor M2 and the output terminal of the second reset transistor M2 is coupled to the gate N1 of the drive transistor M0.

The signal provided by the first signal line DATA controls an on or off state of the first reset transistor M1, and the first reset transistor M1 is configured to transmit the signal provided by the first signal line DATA in response to the signal control of the first signal line DATA. In this manner, the first signal line DATA also serves as a scan signal line of the gate of the first reset transistor M1 so that a scan signal line of the first reset transistor M1 does not need to be disposed in the display panel, the number of scan signal lines in the display panel can be reduced and the driver circuit in the display panel which is connected to the original scan signal line and configured to provide the signal for the scan signal line is omitted. In this manner, the bezel size of the display panel can be reduced while the layout size of the pixel circuit is reduced, thereby achieving the narrow bezel of the display panel. For example, the first signal line DATA provides the first reset signal, the voltage of the first reset signal is relatively low, and in the case where the first reset transistor M1 is a p-type transistor, the first reset transistor M1 is turned on, and the first reset signal is transmitted to the input terminal of the second reset transistor M2; the first signal line DATA provides the data signal, the data signal is greater than the first reset signal, and in the case where the first reset transistor M1 is the p-type transistor, the first reset transistor M1 is cut off, and the data signal will not be transmitted to the gate N1 of the drive transistor M0.

The second scan terminal S2 separately controls an on or off state of the second reset transistor M2.

When the first signal line DATA provides a first reset signal required by the pixel circuit 10 in the present row, a scan signal provided by the second scan terminal S2 is an effective pulse, which can control the second reset transistor M2 to turn on, and the first reset signal is transmitted to the gate N1 of the drive transistor M0 through the first reset transistor M1 and the second reset transistor M2 in sequence.

If the signal provided by the first signal line DATA is a data signal required by the pixel circuit 10 in the present row or a pixel circuit 10 in another row, in this case, the data signal may directly control the first reset transistor M1 to cut off, then the scan signal provided by the second scan terminal S2 may be an effective pulse or an ineffective pulse, and the data signal, which is provided by the first signal line DATA and required by the pixel circuit 10 in the present row or the pixel circuit 10 in another row, will still be blocked by the first reset transistor M1 and will not be written to the gate N1 of the drive transistor M0.

If the signal provided by the first signal line DATA is a first reset signal of a pixel circuit in another row, the scan signal provided by the second scan terminal S2 is an ineffective pulse, which can control the second reset transistor M2 to cut off, and the signal provided by the first signal line DATA is blocked by the second reset transistor M2 and will not be written to the gate N1 of the drive transistor M0.

The first scan terminal S1 separately controls the on or off state of the data write module 11. When the data signal provided by the first signal line DATA is the data signal required by the present pixel circuit 10, the scan signal provided by the first scan terminal S1 is the effective pulse, which can control the data write module 11 to turn on, and the data signal is written to the input terminal N2 of the drive transistor M0. When the data signal provided by the first signal line DATA is not the data signal required by the present pixel circuit 10, the scan signal provided by the first scan terminal S1 is the ineffective pulse, which can control the data write module 11 to block, thereby ensuring that the data signals of other pixel circuits do not affect the display of the present pixel circuit 10.

Figure 6:
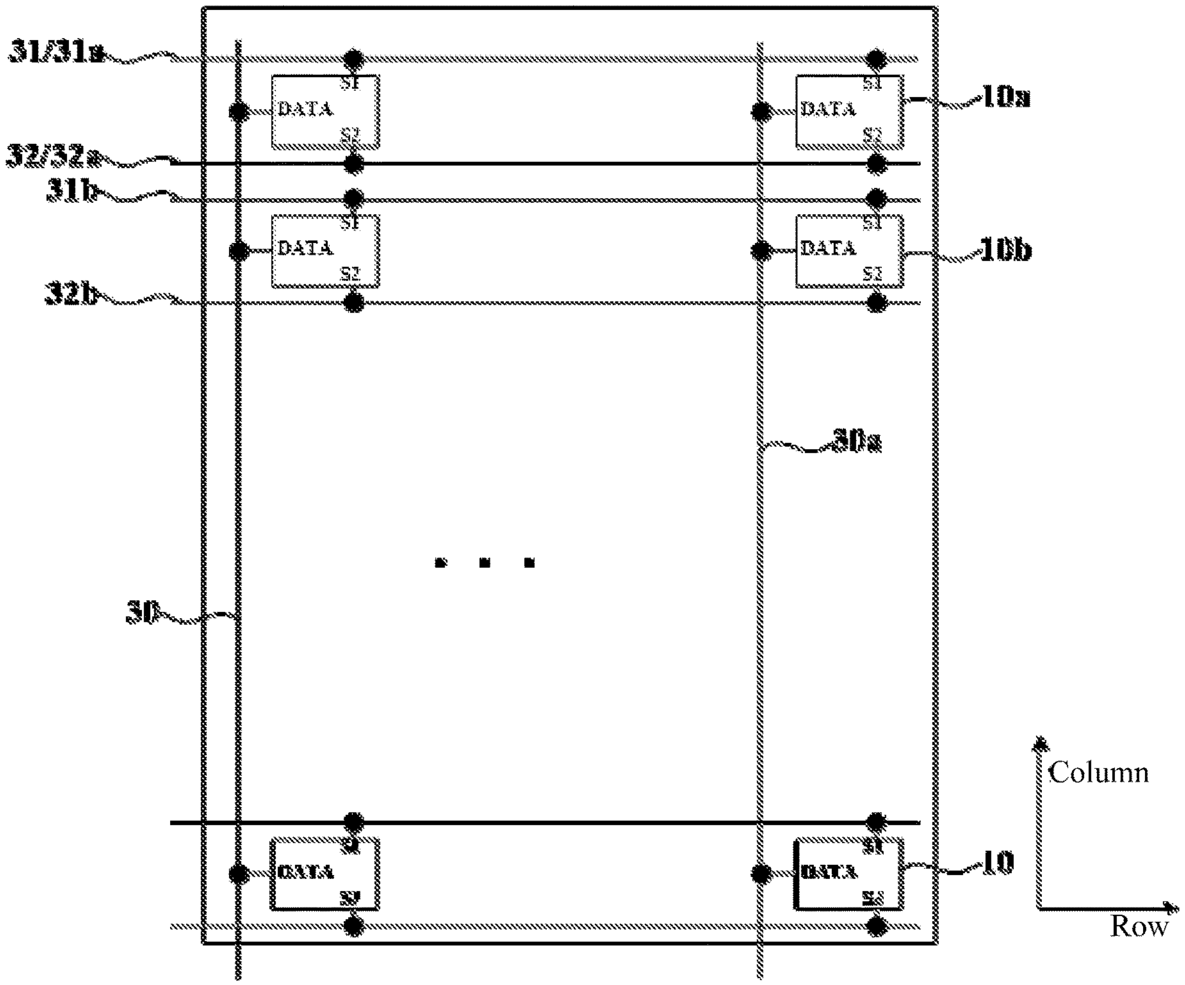
FIG. 6 is a schematic diagram of a display panel according to an embodiment of the present disclosure.

FIG. 6 is a schematic diagram of a display panel according to an embodiment of the present disclosure. As shown in FIG. 6, optionally, the display panel includes a plurality of rows of pixel circuits 10, a plurality of data lines 30, a plurality of first scan lines 31 and a plurality of second scan lines 32. The plurality of data lines 30 are arranged in a row direction, an extension direction of each of the plurality of data lines 30 is parallel to a column direction, and one data line of the plurality of data lines 30 may be electrically connected to pixel circuits 10 in the plurality of rows in the extension direction of the one data line. The plurality of first scan lines 31 are arranged in the column direction, an extension direction of each of the plurality of first scan lines 31 is parallel to the row direction, and one first scan line of the plurality of first scan lines 31 may be electrically connected to first scan terminals S1 of pixel circuits 10 in a plurality of columns in the extension direction of the one first scan line. The plurality of second scan lines 32 are arranged in the column direction, an extension direction of each of the plurality of second scan lines 32 is parallel to the row direction, and one second scan line of the plurality of second scan lines 32 may be electrically connected to second scan terminals S2 of pixel circuits 10 in the plurality of columns in the extension direction of the one second scan line. The data line 30 is a first signal line DATA. The data line 30 which is used as a data signal line provides data signals to data write modules 11 in the pixel circuits 10 electrically connected to the data line 30 in sequence in a working process of the display panel. The data line 30 which also serves as a reference voltage line provides first reset signals to first reset modules 13 in the pixel circuits 10 electrically connected to the data line 30 in sequence. The first scan line 31 provides scan signals to the first scan terminals S1 in the pixel circuits 10 electrically connected to the first scan line 31. The second scan line 32 provides scan signals for the second scan terminals S2 in the pixel circuits 10 electrically connected to the second scan line 32.

A pixel circuit 10*a* and a pixel circuit 10*b* in the same column are used as an example. The pixel circuit 10*a* is located in a first row of pixel circuits 10, and the pixel circuit 10*b* is located in a second row of pixel circuits 10. The pixel circuit 10*a* and the pixel circuit 10*b* are connected to the same data line 30*a*. A first scan terminal S1 of the pixel circuit 10*a* is connected to a first scan line 31*a*, and a second scan terminal S2 of the pixel circuit 10*a* is connected to a second scan line 32*a*. A first scan terminal S1 of the pixel circuit 10*b* is connected to a first scan line 31*b*, and a second scan terminal S2 of the pixel circuit 10*b* is connected to a second scan line 32*b*.

A working process of the pixel circuit 10 includes the following described below.

(1) The data line 30*a* provides a first reset signal to the pixel circuit 10*a* in the first row, and thus the first reset signal controls a first reset transistor M1 in the pixel circuit 10*a* to turn on. In this case, a scan signal provided by the second scan line 32*a* is an effective pulse, and thus the effective scan signal controls a second reset transistor M2 in the pixel circuit 10*a* to turn on. Therefore, the first reset signal is written to a gate N1 of a drive transistor M0 of the pixel circuit 10*a* in the first row through the first reset transistor M1 and the second reset transistor M2 in the pixel circuit 10*a* in sequence. Moreover, the first reset signal provided by the data line 30*a* to the pixel circuit 10*a* in the first row may also control a first reset transistor M1 of the pixel circuit 10*b* in the second row to turn on. In this case, a scan signal provided by the second scan line 32*b* is an ineffective pulse, and thus the ineffective scan signal controls a second reset transistor M2 in the pixel circuit 10*b* to cut off. Therefore, the transmission of the first reset signal is blocked by the second reset transistor M2 in the pixel circuit 10*b*, and the first reset signal provided by the data line 30*a* to the pixel circuit 10*a* in the first row will not be written to a gate N1 of a drive transistor M0 of the pixel circuit 10*b* in the second row.

(2) The data line 30*a* provides a data signal to the pixel circuit 10*a* in the first row, and the data signal may control a first reset transistor M1 of each pixel circuit 10 in the column to cut off. Therefore, a diode connection manner of the first reset transistor M1 can block the transmission of the data signal so that the data signal will not be written to a gate N1 of a drive transistor M0 of the pixel circuit 10.

As described above, the second reset transistor M2 is disposed in the pixel circuit 10. A gate of the second reset transistor M2 is connected to the second scan terminal S2, and the second scan terminal S2 separately controls an on or off state of the second reset transistor M2 so that the present pixel circuit controlled by the second scan terminal S2 is prevented from being disturbed when the first signal line provides signals to other rows of pixel circuits. When a pixel circuit 10 in an n-th row is reset, a second reset transistor M2 in the pixel circuit 10 in the n-th row is turned on so that a first reset signal of the pixel circuit 10 in the n-th row provided by the data line 30 may be written to a gate N1 of a drive transistor M0 in the n-th row. When the pixel circuit 10 in the n-th row is reset, even if a first reset transistor M1 in a pixel circuit 10 in an (n+1)-th row is turned on in response to the first reset signal, a second reset transistor M2 the pixel circuit 10 in the (n+1)-th row is cut off in response to the second scan terminal S2 so that the first reset signal of the pixel circuit 10 in the n-th row provided by the data line 30 will not be written to a gate N1 of a drive transistor M0 in the (n+1)-th row.

Similarly, when the first reset signal is written to the (n+1)-th row, since the second reset transistor M2 in the pixel circuit 10 in the n-th row is cut off in response to the second scan terminal S2, the first reset signal of the pixel circuit 10 in the (n+1)-th row provided by the data line 30 will not be written to the gate N1 of the drive transistor M0 in the n-th row. A reset effect on upper and lower rows of pixel circuits 10 is avoided, and normal working of each row of pixel circuits 10 is ensured.

The first reset transistor M1 is disposed in the pixel circuit 10. A gate of the first reset transistor M1 is connected to an input terminal of the first reset transistor M1 so that the first reset transistor M1 can block the transmission of the data signal and the data signal will not be written to the gate N1 of the drive transistor M0 of the pixel circuit 10 through the first reset module 13.

Based on this, the first signal line DATA and the second scan terminal S2 cooperate to work. The diode design of the first reset transistor M1 can ensure that the data signal will not be transferred to the gate N1 of the drive transistor M0, and the second scan terminal S2 separately controls the on or off of the second reset transistor M2 to ensure that first reset signals of other pixel circuits will not be transferred to the gate N1 of the drive transistor M0 of the present pixel circuit 10.

Figure 7:
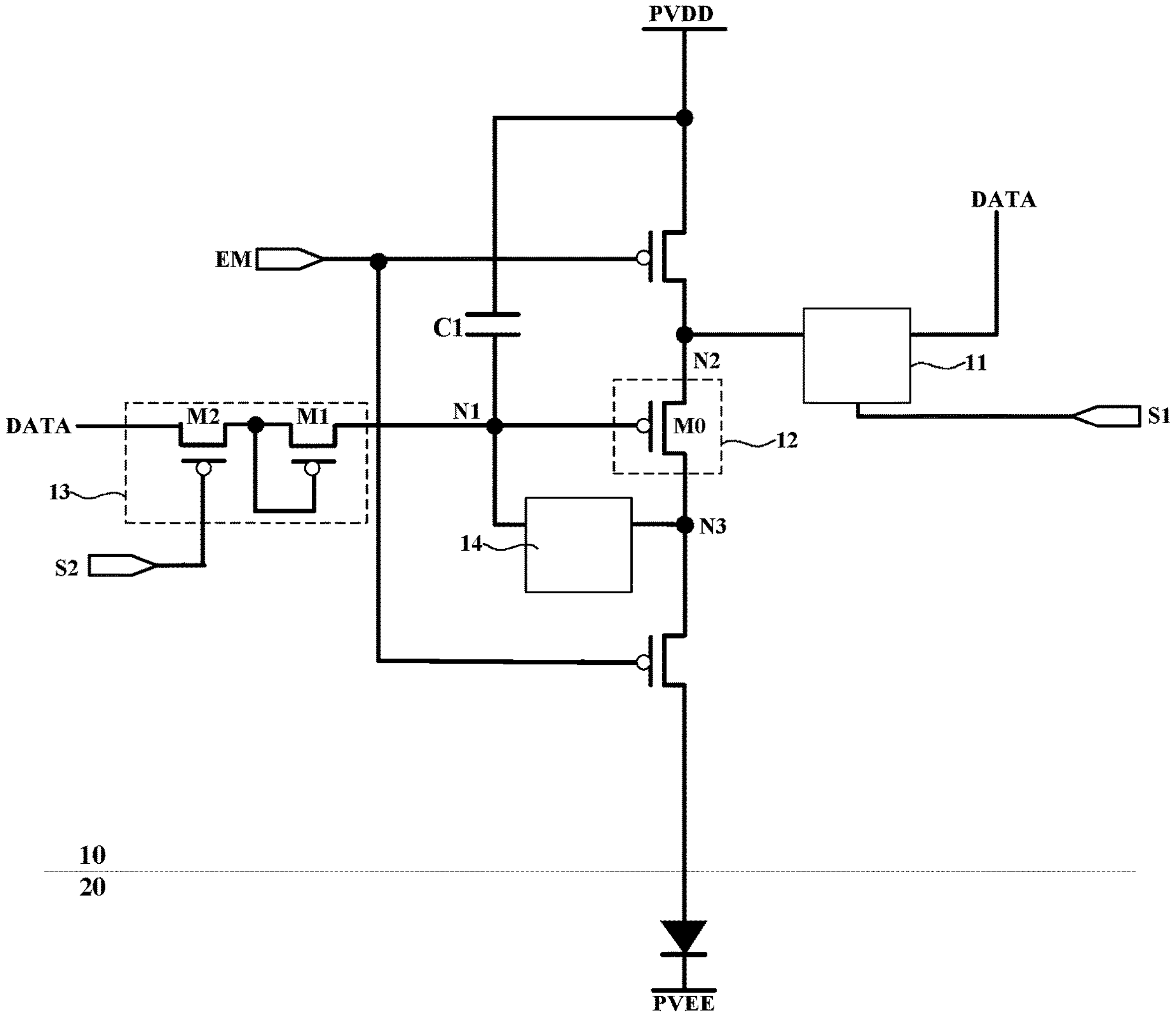
FIG. 7 is a schematic diagram of another pixel circuit according to an embodiment of the present disclosure.

FIG. 7 is a schematic diagram of another pixel circuit according to an embodiment of the present disclosure. FIG. 7 differs from FIG. 5 in that as shown in FIG. 7, optionally, the input terminal of the second reset transistor M2 is connected to the first signal line DATA, the output terminal of the second reset transistor M2 is connected to the input terminal of the first reset transistor M1 and the output terminal of the first reset transistor M1 is connected to the gate N1 of the drive transistor M0.

In the present embodiment, the input terminal of the second reset transistor M2 is connected to the first signal line DATA, the output terminal of the second reset transistor M2 is connected to the input terminal of the first reset transistor M1, and the gate of the second reset transistor M2 is connected to the second scan terminal S2. The output terminal of the first reset transistor M1 is connected to the gate N1 of the drive transistor M0, and the gate of the first reset transistor M1 is connected to the input terminal of the first reset transistor M1.

The second scan terminal S2 separately controls the on or off state of the second reset transistor M2.

When the first signal line DATA provides the first reset signal required by the pixel circuit 10 in the present row, the scan signal provided by the second scan terminal S2 is the effective pulse, which can control the second reset transistor M2 to turn on, and the first reset signal is written to the input terminal of the first reset transistor M1 through the second reset transistor M2. The first reset transistor M1 uses the diode connection manner. In the case where the first reset transistor M1 is the p-type transistor, the voltage of the first reset signal is relatively low, which can control the first reset transistor M1 to turn on, and the first reset signal is written to the gate N1 of the drive transistor M0 through the first reset transistor M1.

If the signal provided by the first signal line DATA is the data signal required by the pixel circuit 10 in the present row, the scan signal provided by the second scan terminal S2 may remain as the effective pulse. In this case, the second reset transistor M2 is turned on. However, the data signal may control the first reset transistor M1 to cut off. Therefore, the data signal, which is provided by the first signal line DATA and required by the pixel circuit 10 in the present row, will still be blocked by the first reset module 13 and will not be written to the gate N1 of the drive transistor M0. In other embodiments, optionally, if the signal provided by the first signal line is the data signal required by the pixel circuit in the present row, the second scan terminal may also provide the ineffective pulse to enable the second reset transistor to cut off.

When the signal provided by the first signal line DATA is not the first reset signal required by the pixel circuit 10 in the present row, for example, the signal provided by the first signal line DATA is the data signal required by a pixel circuit 10 in another row or the signal provided by the first signal line DATA is the first reset signal of the pixel circuit 10 in another row, then the scan signal provided by the second scan terminal S2 is the ineffective pulse, which can control the second reset transistor M2 to cut off, and the signal provided by the first signal line DATA is blocked by the first reset module 13 and will not be written to the gate N1 of the drive transistor M0. In other embodiments, optionally, if the signal provided by the first signal line is the data signal required by a pixel circuit in another row, the second scan terminal may also provide the effective pulse to enable the second reset transistor to turn on. However, the data signal of the pixel circuit in another row will control the first reset transistor to cut off after passing through the second reset transistor. Therefore, data signals of pixels in another row will not be written to the gate of the drive transistor through the first reset module.

The signal provided by the first signal line DATA will control the on or off state of the first reset transistor M1 after passing through the second reset transistor M2, and the first reset transistor M1 is configured to transmit the signal provided by the first signal line DATA in response to the signal control of the first signal line DATA. In this manner, the first signal line DATA also serves as the scan signal line of the gate of the first reset transistor M1 so that the scan signal line of the first reset transistor M1 does not need to be disposed in the display panel, the number of signal lines in the display panel can be reduced and the driver circuit in the display panel which is connected to the original scan signal line and configured to provide the signal for the scan signal line is omitted. In this manner, the bezel size of the display panel can be reduced while the layout size of the pixel circuit is reduced, which is conducive to achieving the narrow bezel of the display panel.

The first scan terminal S1 separately controls the on or off state of the data write module 11. When the data signal provided by the first signal line DATA is the data signal required by the present pixel circuit 10, the scan signal provided by the first scan terminal S1 is the effective pulse, which can control the data write module 11 to turn on. When the data signal provided by the first signal line DATA is not the data signal required by the present pixel circuit 10, the scan signal provided by the first scan terminal S1 is the ineffective pulse, which can control the data write module 11 to block.

Based on this, the first signal line DATA and the second scan terminal S2 cooperate to work. The second scan terminal S2 separately controls the on or off of the second reset transistor M2 to ensure that signals which are provided by the first signal line DATA and required by other rows of pixel circuits will not be transmitted to the gate N1 of the drive transistor M0 of the present pixel circuit 10, and the diode design of the first reset transistor M1 can ensure that the first reset signal is transmitted to the gate N1 of the drive transistor M0 and controls the data signal provided by the first signal line DATA not to affect a potential of the gate of the drive transistor M0 through the first reset transistor M1 when the first signal line DATA transmits the data signal.

Figure 8:
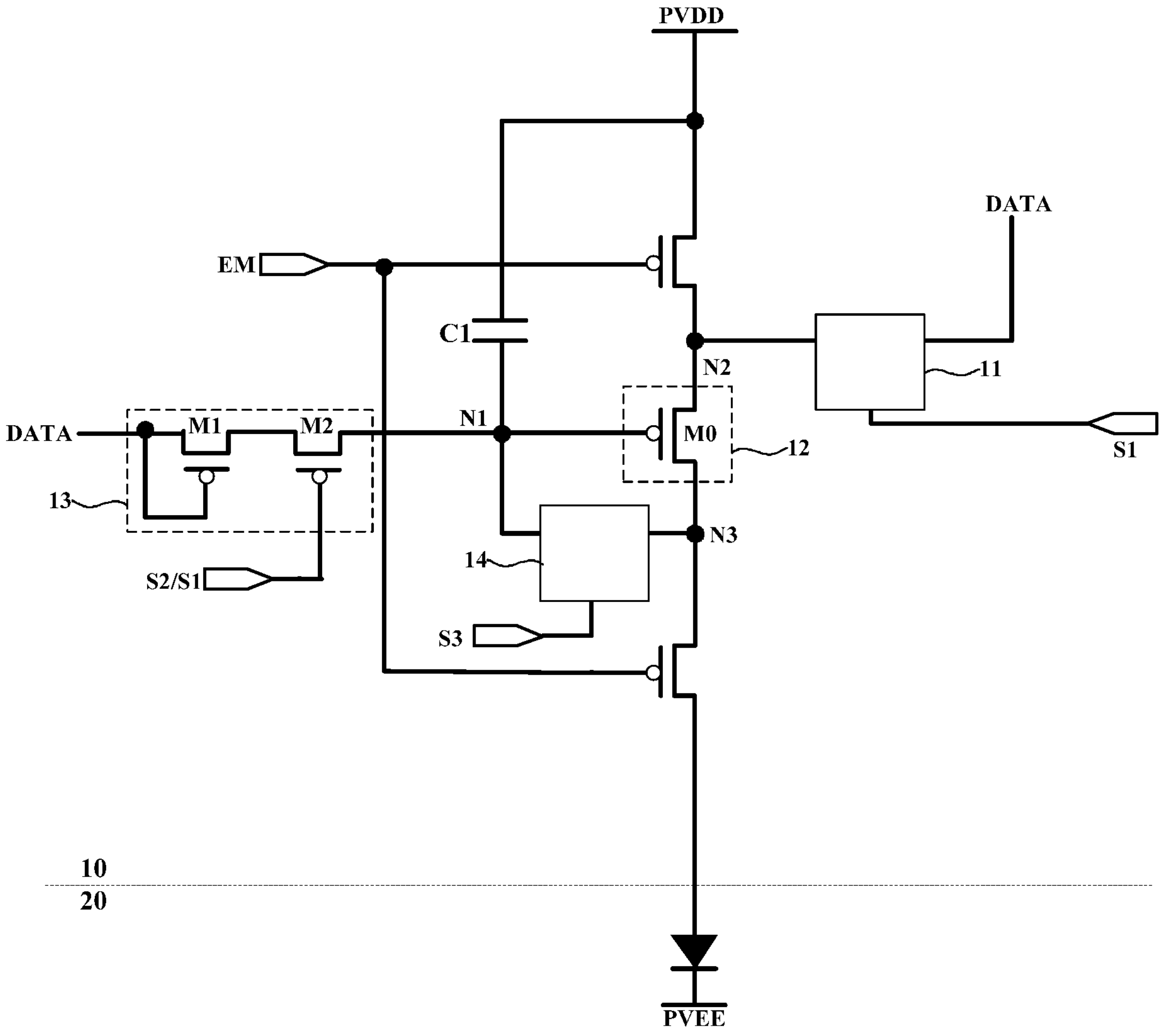
FIG. 8 is a schematic diagram of another pixel circuit according to an embodiment of the present disclosure.
Figure 9:
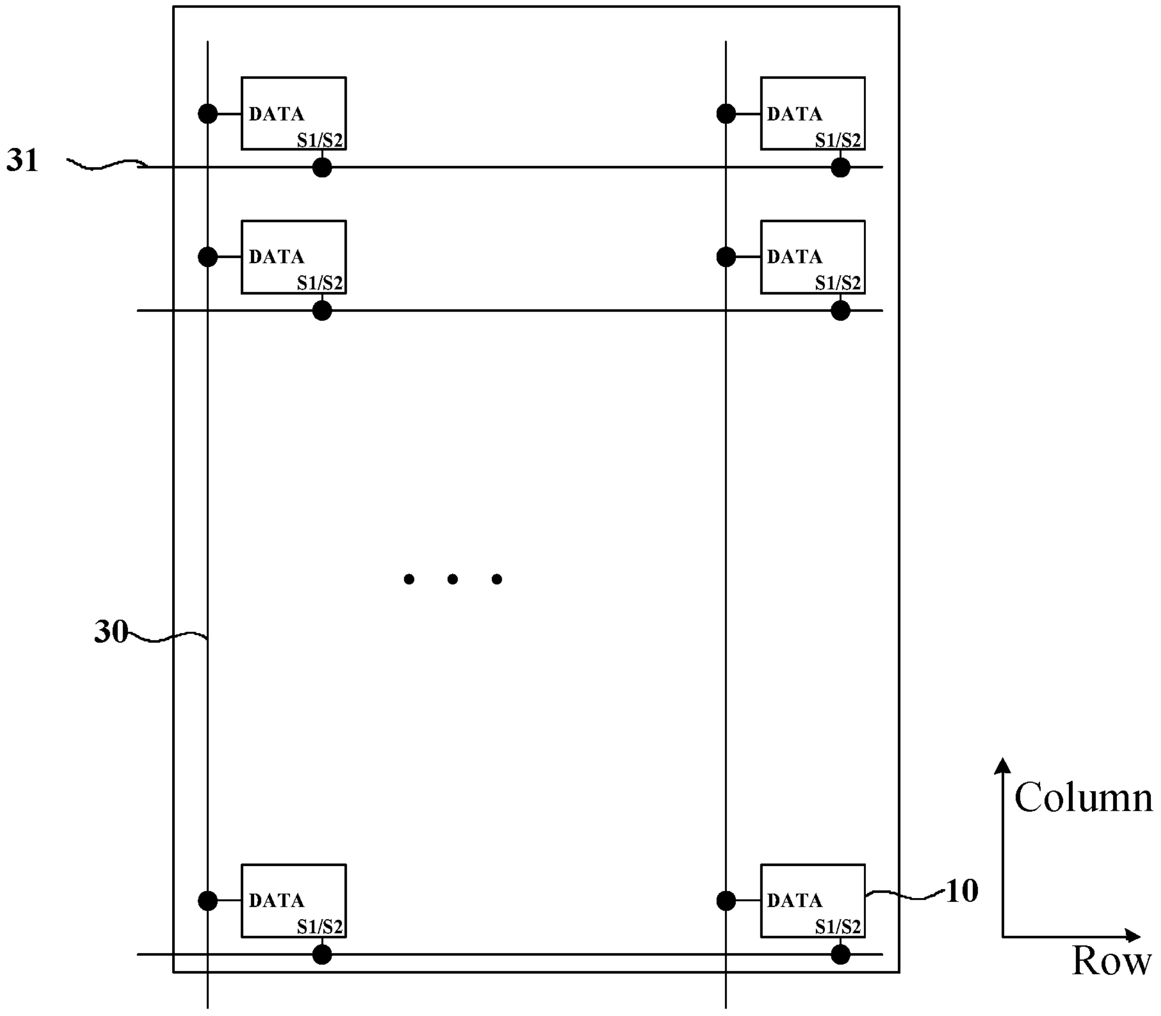
FIG. 9 is a schematic diagram of another display panel according to an embodiment of the present disclosure.

FIG. 8 is a schematic diagram of another pixel circuit according to an embodiment of the present disclosure. FIG. 9 is a schematic diagram of another display panel according to an embodiment of the present disclosure. In conjunction with FIGS. 8 and 9, optionally, the second scan terminal S2 and the first scan terminal S1 are coupled to the same scan signal line 31. The scan signal line 31 provides an effective scan signal or an ineffective scan signal to the second scan terminal S2 and the first scan terminal S1 so that the second reset transistor M2 and the data write module 11 are turned on or cut off at the same time.

When a data line 30 provides the first reset signal, the scan signal line 31 provides the effective scan signal to the second scan terminal S2 and the first scan terminal S1 so that the second reset transistor M2 and the data write module 11 are turned on at the same time, the first reset signal controls the first reset transistor M1 to turn on so that the first reset signal is written to the gate N1 of the drive transistor M0 through the first reset module 13, and the first reset signal is also written to the input terminal N2 of the drive transistor M0 through the data write module 11. Thus, the drive transistor is reset, and the bias state of the drive transistor is adjusted.

When the data line 30 provides the data signal, the scan signal line 31 provides the effective scan signal to the second scan terminal S2 and the first scan terminal S1 so that the second reset transistor M2 and the data write module 11 are turned on at the same time, the data signal controls the first reset transistor M1 to cut off so that the data signal will not be written to the gate N1 of the drive transistor M0 through the first reset module 13, and the data signal is written to the input terminal N2 of the drive transistor M0 through the data write module 11.

When the data line 30 provides other signals, the scan signal line 31 provides the ineffective scan signal to the second scan terminal S2 and the first scan terminal S1 so that the second reset transistor M2 and the data write module 11 are cut off at the same time and the other signals will not be written to the gate N1 and the input terminal N2 of the drive transistor M0.

Under the control of the first reset signal and the data signal provided by the first signal line DATA, the first reset transistor M1 in the first reset module 13 may be in the on and off states, respectively, that is, the presence of the first reset transistor M1 may cause the first reset module 13 to control whether the signal of the first signal line DATA is transmitted to the gate of the drive transistor M0 at the first reset stage and the data write stage, and an enable period of a signal of the second scan terminal S2 connected to the second reset transistor M2 may not distinguish the first reset stage and the data write stage, that is, a scan signal of the second scan terminal S2 may control the second reset transistor M2 to be at the on state at both the first reset stage and the data write stage. Therefore, the second scan terminal S2 and the first scan terminal S1 may be set to couple to the same scan signal line.

In the present embodiment, the first signal line DATA also serves as the data signal line, the reference voltage line and the scan signal line of the first reset transistor M1, and the second scan terminal S2 and the first scan terminal S1 are coupled to the same scan signal line 31, thereby reducing the reference voltage lines and also reducing at least two scan signal lines. On the one hand, the layout area of the pixel circuit is reduced, which is conducive to achieving a high pixels per inch (PPI) design of the display panel or a transparent display design of the display panel. On the other hand, when the scan signal line is reduced, the driver circuit in the display panel which is connected to the original scan signal line and configured to provide the signal for the original scan signal line is correspondingly removed, which is conducive to reducing a bezel area of the display panel, thereby achieving the narrow bezel design.

Referring to FIGS. 2 and 8, optionally, the pixel circuit 10 further includes a compensation module 14, the compensation module 14 is connected between the gate N1 of the drive transistor M0 and the output terminal N3 of the drive transistor M0, and a control terminal of the compensation module 14 is connected to a third scan terminal S3.

The third scan terminal S3 controls an on or off state of the compensation module 14, and a scan signal provided by the third scan terminal S3 is a pulse signal. When the scan signal provided by the third scan terminal S3 is an effective pulse, the compensation module 14 is turned on so that signal transmission can be achieved between the gate N1 of the drive transistor M0 and the output terminal N3 of the drive transistor M0. When the scan signal provided by the third scan terminal S3 is an ineffective pulse, the compensation module 14 is cut off so that the compensation module 14 blocks the signal transmission between the gate N1 of the drive transistor M0 and the output terminal N3 of the drive transistor M0.

Figure 10:
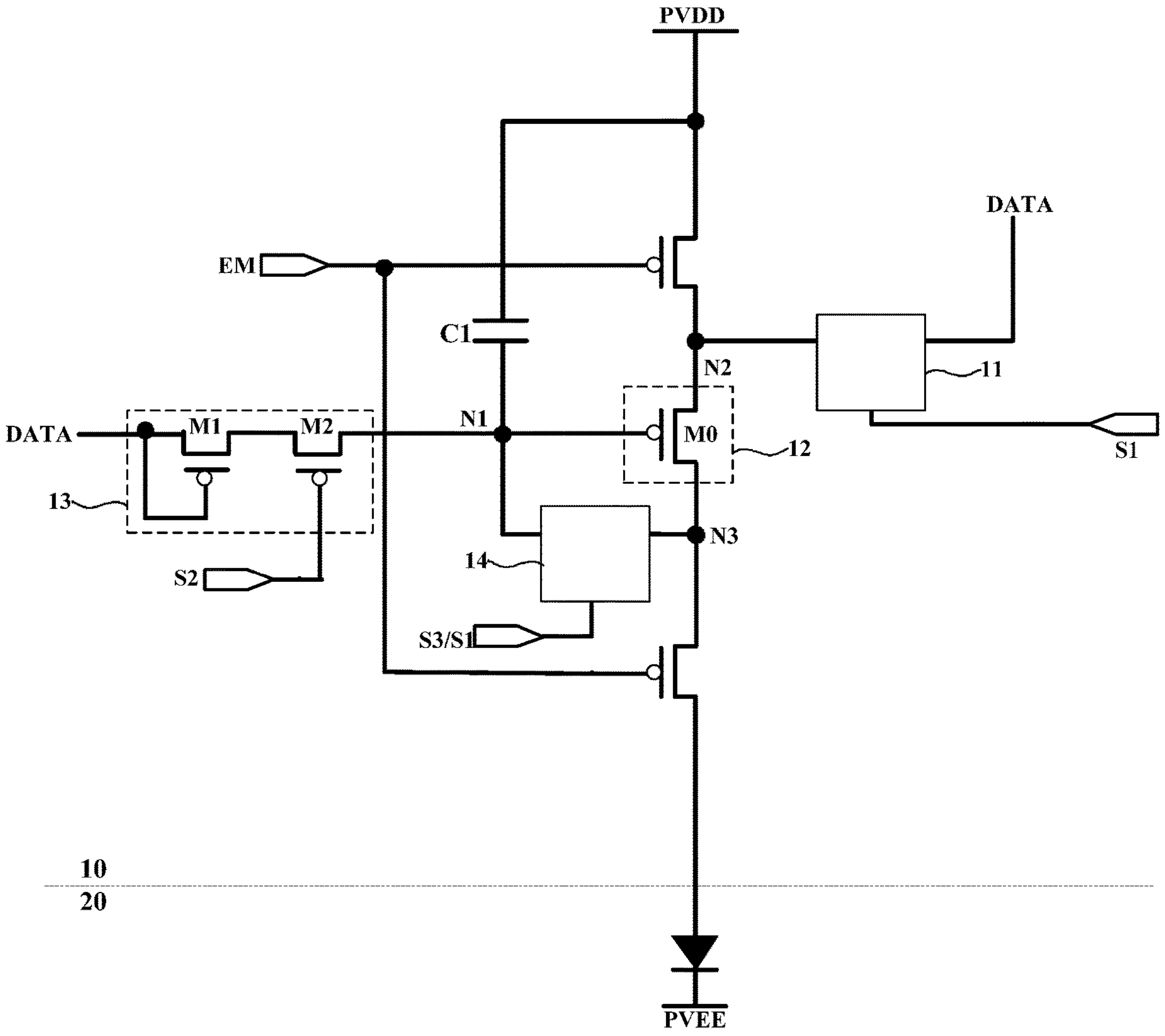
FIG. 10 is a schematic diagram of another pixel circuit according to an embodiment of the present disclosure.

FIG. 10 is a schematic diagram of another pixel circuit according to an embodiment of the present disclosure. Optionally, the third scan terminal S3 and the first scan terminal S1 are coupled to the same scan signal line. In the present embodiment, the control terminal of the compensation module 14 and the control terminal of the data write module 11 are coupled to the same scan signal line so that the number of scan signal lines in the display panel is reduced, which is conducive to reducing the layout area of the pixel circuit and achieving the narrow bezel of the display panel.

Figure 11:
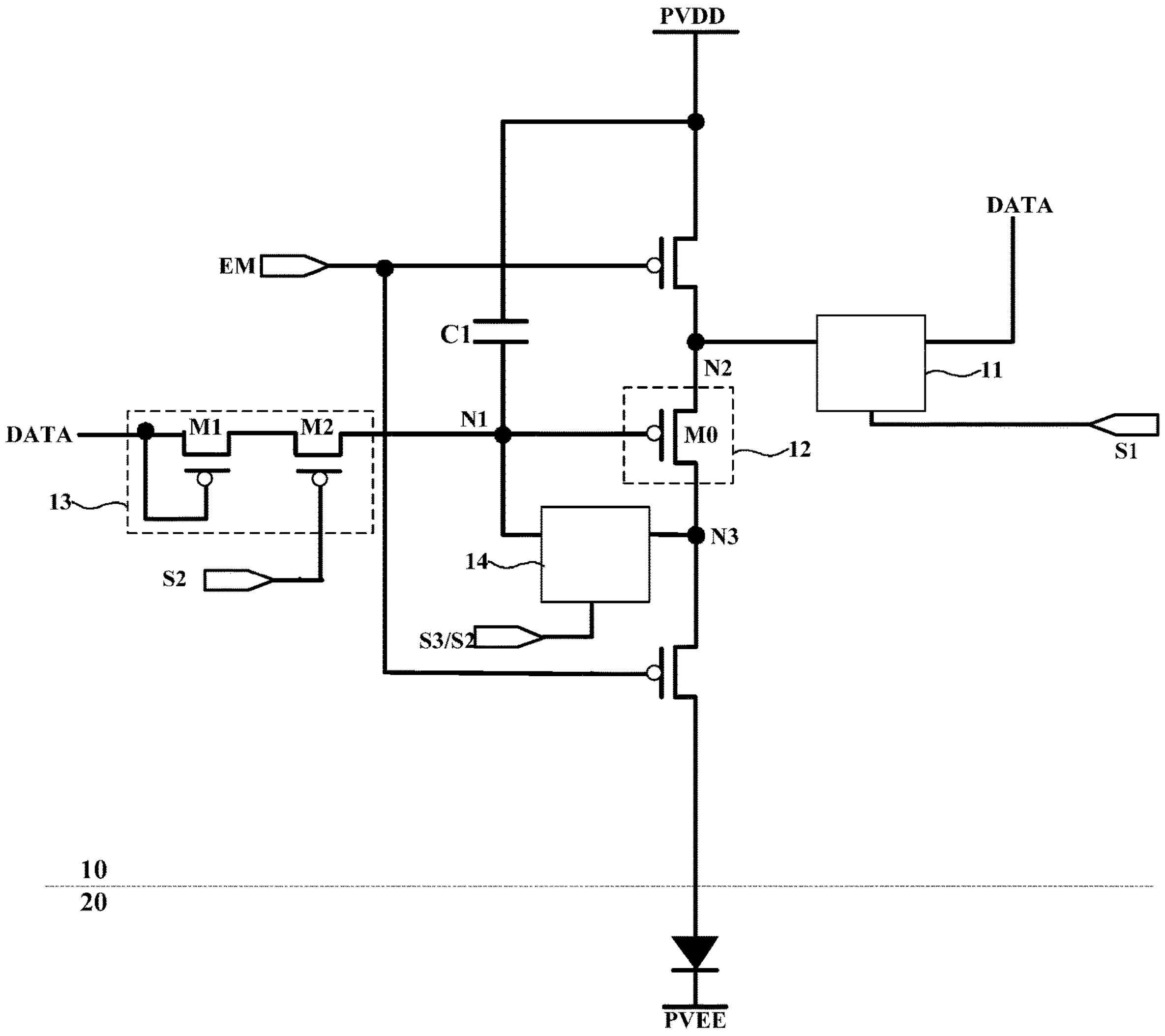
FIG. 11 is a schematic diagram of another pixel circuit according to an embodiment of the present disclosure.

FIG. 11 is a schematic diagram of another pixel circuit according to an embodiment of the present disclosure. Optionally, the third scan terminal S3 and the second scan terminal S2 are coupled to the same scan signal line. In the present embodiment, the control terminal of the compensation module 14 and the gate of the second reset transistor M2 are coupled to the same scan signal line so that the number of scan signal lines in the display panel is reduced, which is conducive to reducing the layout area of the pixel circuit and achieving the narrow bezel of the display panel.

Figure 12:
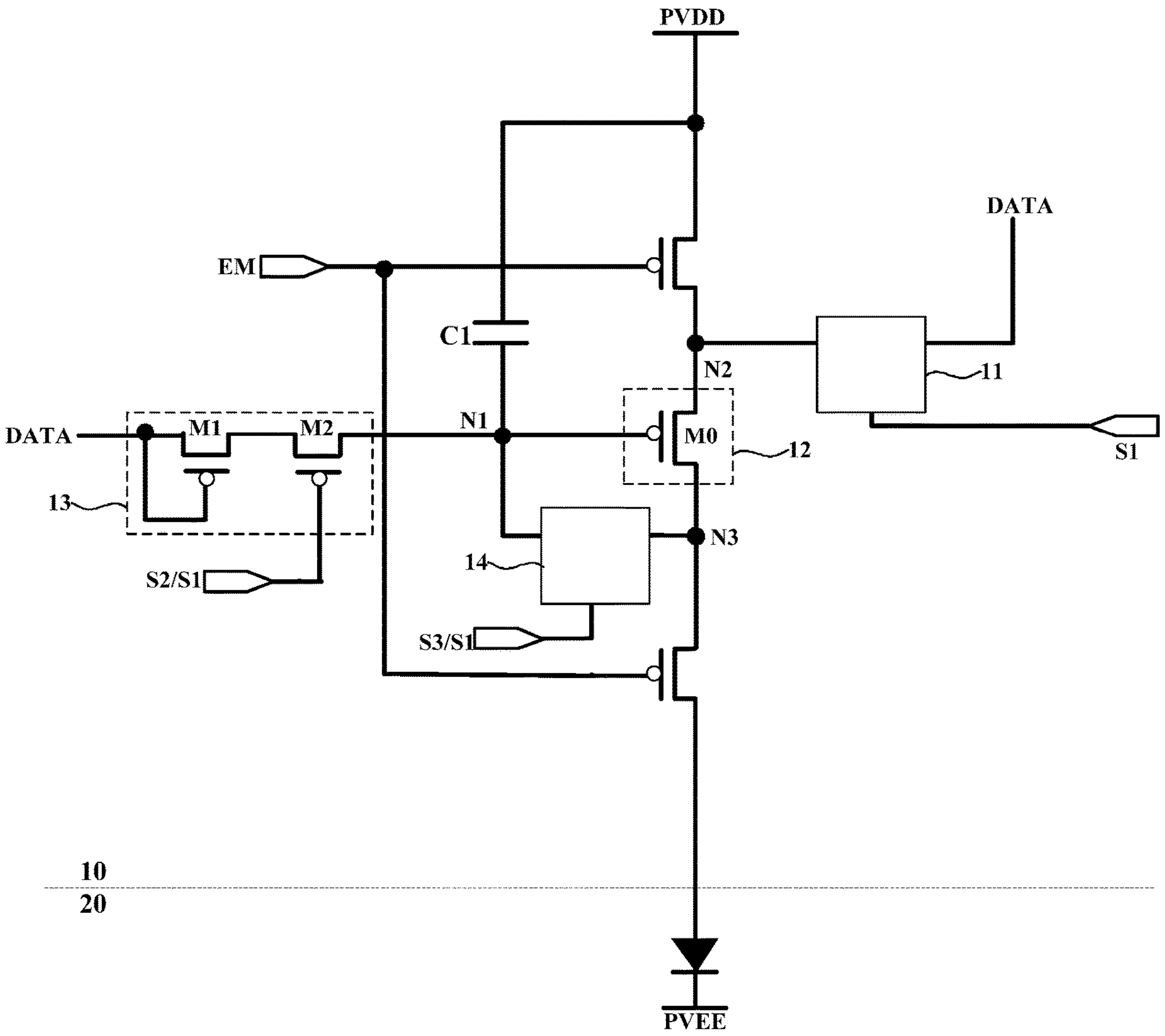
FIG. 12 is a schematic diagram of another pixel circuit according to an embodiment of the present disclosure.

FIG. 12 is a schematic diagram of another pixel circuit according to an embodiment of the present disclosure. Optionally, the third scan terminal S3, the first scan terminal S1 and the second scan terminal S2 are coupled to the same scan signal line. In the present embodiment, the control terminal of the compensation module 14, the gate of the second reset transistor M2 and the control terminal of the data write module 11 are coupled to the same scan signal line so that the scan signal lines in the pixel circuit 10 can be reduced to include only one scan signal line, that is, one row of pixel circuits 10 is controlled by only one scan signal line. In the case where the pixel circuit 10 further includes the compensation module, the data write module 11, the first reset module 13 and the compensation module 14 can be controlled by only one scan signal line, and the pixel circuit is enabled to complete a working process including at least the first reset stage and the data write stage, that is, a threshold compensation function of the pixel circuit is ensured, and the number of scan signal lines is reduced.

Referring to FIG. 2, optionally, the pixel circuit 10 further includes a second reset module 15, the second reset module 15 is connected between a second signal terminal V2 and a first electrode N4 of the light-emitting element 20 and configured to transmit a signal of the second signal terminal V2 to the first electrode N4 of the light-emitting element 20, and the output terminal N3 of the drive transistor M0 is coupled to the first electrode N4 of the light-emitting element 20.

In the present embodiment, the output terminal N3 of the drive transistor M0 is coupled to the first electrode of the light-emitting element 20, where N4 characterizes a first electrode in the pixel circuit 10. The second reset module 15 is connected between the second signal terminal V2 and the first electrode N4 of the light-emitting element 20. When the second reset module 15 is turned on, the second reset module 15 transmits the signal of the second signal terminal V2 to the first electrode N4 of the light-emitting element 20 to achieve the voltage regulation of the first electrode N4 of the light-emitting element 20. When the second reset module 15 is cut off, the signal of the second signal terminal V2 will not be transmitted to the first electrode N4 of the light-emitting element 20. Generally, when the second reset module 15 is turned on, a voltage of the signal of the second signal terminal V2 is relatively low, which can reset the light-emitting element 20.

Figure 13:
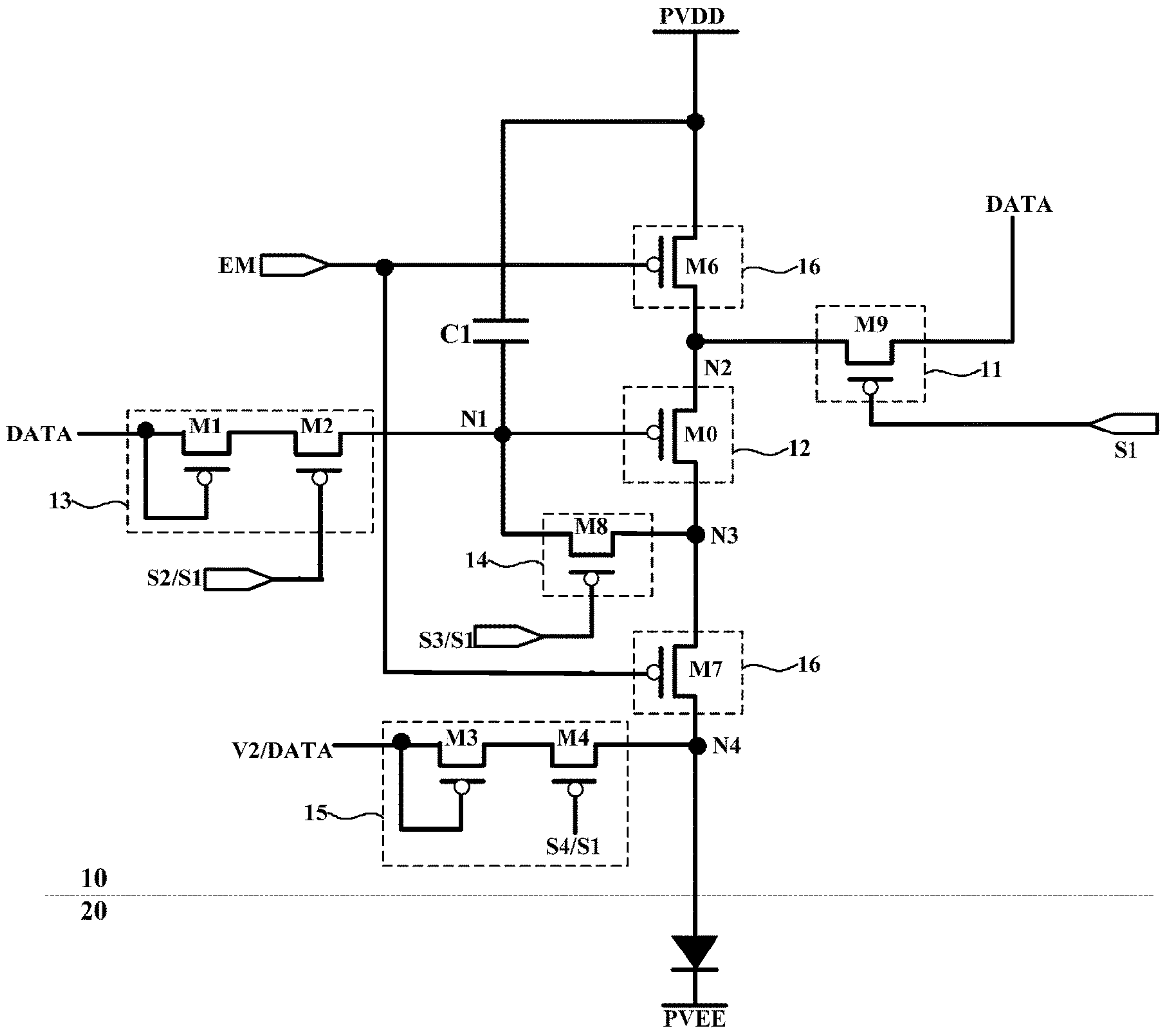
FIG. 13 is a schematic diagram of another pixel circuit according to an embodiment of the present disclosure.

FIG. 13 is a schematic diagram of another pixel circuit according to an embodiment of the present disclosure. Optionally, the second signal terminal V2 is coupled to the first signal line DATA and the second reset module 15 includes a third reset transistor M3 and a fourth reset transistor M4 which are connected in series, a gate of the third reset transistor M3 is connected to an input terminal of the third reset transistor M3, and a gate of the fourth reset transistor M4 is connected to a fourth scan terminal S4. Optionally, both the third reset transistor M3 and the first reset transistor M1 are p-type transistors. In the present embodiment, the input terminal of the third reset transistor M3 is connected to the first signal line DATA, an output terminal of the third reset transistor M3 is connected to an input terminal of the fourth reset transistor M4, and the gate of the third reset transistor M3 is connected to the input terminal of the third reset transistor M3, that is, the third reset transistor M3 is applied as a diode to the second reset module 15. An output terminal of the fourth reset transistor M4 is connected to the first electrode N4 of the light-emitting element 20, and the gate of the fourth reset transistor M4 is connected to the fourth scan terminal S4.

The signal provided by the first signal line DATA controls an on or off state of the third reset transistor M3 so that the first signal line DATA also serves as a scan signal line of the gate of the third reset transistor M3 and a scan signal line of the third reset transistor M3 does not need to be disposed in the display panel. In addition, the signal provided by the first signal line DATA may be transmitted through the third reset transistor M3 so that the first signal line DATA also serves as a reference voltage line required by the second reset module 15 and a reference voltage line required by the second reset module 15 does not need to be disposed in the display panel. In this manner, the number of signal lines in the display panel can be reduced, and the driver circuit in the display panel which is connected to the original scan signal line and configured to provide the signal for the scan signal line is omitted. In this manner, the bezel size of the display panel can be reduced while the layout size of the pixel circuit is reduced, which is conducive to achieving the narrow bezel of the display panel. For example, the first signal line DATA provides a second reset signal, a voltage of the second reset signal is relatively low, and in the case where the third reset transistor M3 is a p-type transistor, the third reset transistor M3 is turned on, and the second reset signal is transmitted to the input terminal of the fourth reset transistor M4; and the first signal line DATA provides a data signal, the data signal is greater than the second reset signal, and in the case where the third reset transistor M3 is the p-type transistor, the third reset transistor M3 is cut off, and the data signal will not be transmitted to the first electrode N4 of the light-emitting element 20.

The fourth scan terminal S4 controls an on or off state of the fourth reset transistor M4. When the first signal line DATA provides a second reset signal required by the pixel circuit 10 in the present row, a scan signal provided by the fourth scan terminal S4 is an effective pulse, which can control the fourth reset transistor M4 to turn on, and the second reset signal is transmitted to the first electrode N4 of the light-emitting element 20. When the signal provided by the first signal line DATA is not the second reset signal required by the pixel circuit 10 in the present row, the scan signal provided by the fourth scan terminal S4 is an ineffective pulse, which can control the fourth reset transistor M4 to cut off, and the signal provided by the first signal line DATA will not be written to the first electrode N4 of the light-emitting element 20.

It is to be noted that when the signal provided by the first signal line is not the second reset signal required by the pixel circuit in the present row, if the signal provided by the first signal line controls the third reset transistor to cut off, the signal provided by the first signal line is blocked by the third reset transistor and will not be written to the first electrode of the light-emitting element. In this case, the scan signal provided by the fourth scan terminal may be the effective pulse or the ineffective pulse, and the on or off state of the fourth reset transistor does not affect a blocking function of the second reset module.

Figure 14:
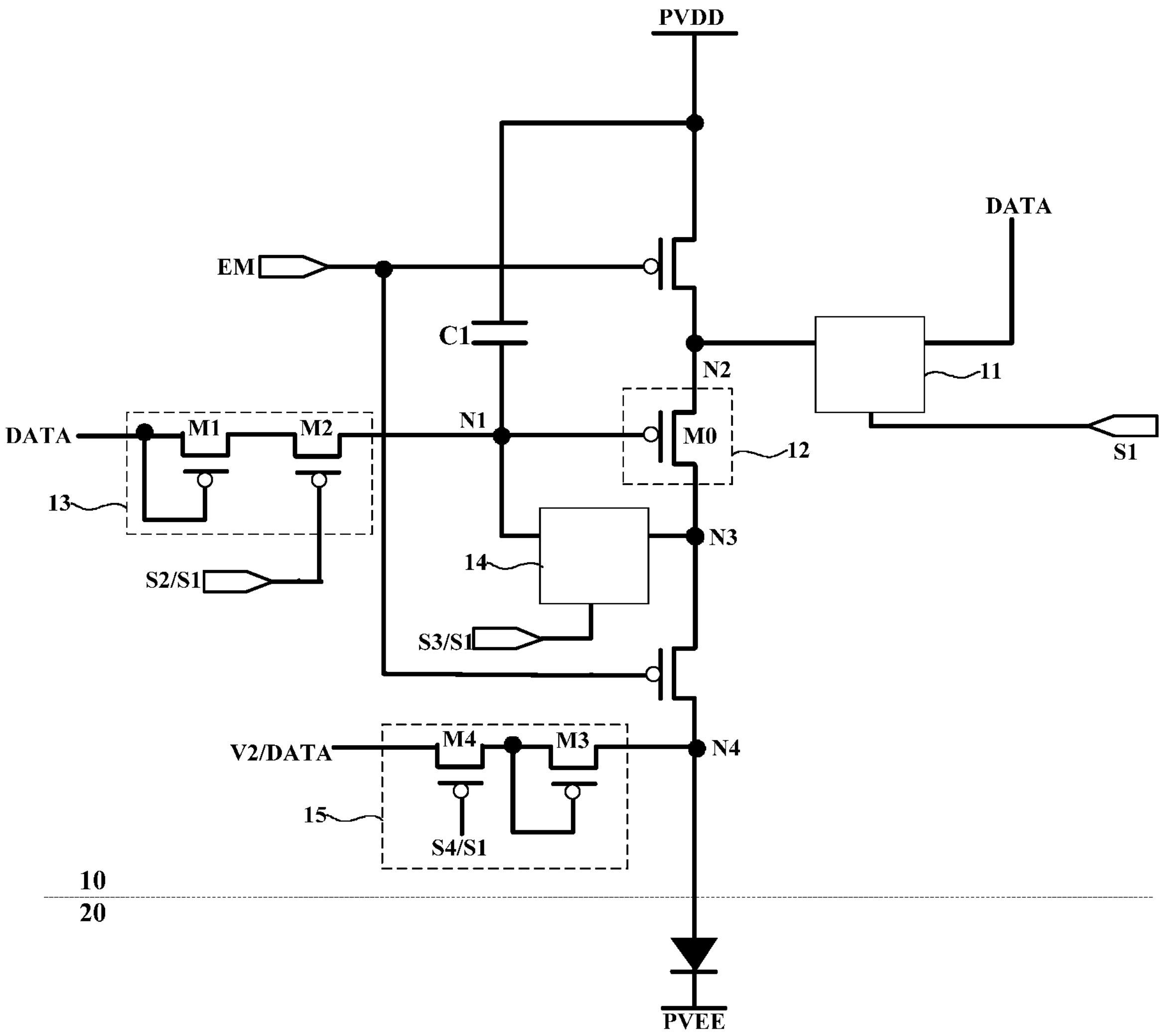
FIG. 14 is a schematic diagram of another pixel circuit according to an embodiment of the present disclosure.

FIG. 14 is a schematic diagram of another pixel circuit according to an embodiment of the present disclosure. FIG. 14 differs from FIG. 13 in that optionally, the input terminal of the fourth reset transistor M4 is connected to the first signal line DATA, the output terminal of the fourth reset transistor M4 is connected to the input terminal of the third reset transistor M3 and the gate of the fourth reset transistor M4 is connected to the fourth scan terminal S4. The output terminal of the third reset transistor M3 is connected to the first electrode N4 of the light-emitting element 20, and the gate of the third reset transistor M3 is connected to the input terminal of the third reset transistor M3, that is, the third reset transistor M3 is applied as the diode to the second reset module 15. When the first signal line DATA provides the second reset signal required by the pixel circuit 10 in the present row, the scan signal provided by the fourth scan terminal S4 is the effective pulse, which can control the fourth reset transistor M4 to turn on, and the second reset signal is transmitted to the gate of the third reset transistor M3 to control the third reset transistor M3 to turn on and then transmitted to the first electrode N4 of the light-emitting element 20. When the signal provided by the first signal line DATA is not the second reset signal required by the pixel circuit 10 in the present row, the scan signal provided by the fourth scan terminal S4 is the ineffective pulse, which can control the fourth reset transistor M4 to cut off, and thus the signal provided by the first signal line DATA is cut off and will not be written to the first electrode N4 of the light-emitting element 20.

It is to be noted that when the signal provided by the first signal line is a data signal required by the pixel circuit in the present row or a pixel circuit in another row, the scan signal provided by the fourth scan terminal may be the effective pulse or the ineffective pulse. If the fourth reset transistor is turned on, the data signal provided by the first signal line will control the third reset transistor to cut off, and the third reset transistor may block the data signal from being written to the first electrode of the light-emitting element; and if the fourth reset transistor is cut off, the data signal provided by the first signal line will be blocked by the fourth reset transistor and will not be written to the first electrode of the light-emitting element.

Optionally, the second reset signal is the first reset signal. When the first signal line DATA provides the reset signal required by the pixel circuit 10 in the present row, the first reset module 13 and the second reset module 15 are turned on at the same time, and the reset voltage provided by the first signal line DATA is separately written to the gate N1 of the drive transistor M0 and the first electrode N4 of the light-emitting element 20.

In other embodiments, optionally, the second reset signal is different from the first reset signal. The working process of the pixel circuit includes a first reset stage and a second reset stage. At the first reset stage, the first reset signal provided by the first signal line and the second scan terminal cooperate to control the first reset module to turn on, and the first reset signal and the fourth scan terminal cooperate to control the second reset module to cut off. At the second reset stage, the second reset signal provided by the first signal line and the fourth scan terminal cooperate to control the second reset module to turn on, and the second reset signal and the second scan terminal cooperate to control the first reset module to cut off. Alternatively, optionally, both the third reset transistor and the first reset transistor are n-type transistors.

As shown in FIG. 14, optionally, the fourth scan terminal S4, the first scan terminal S1 and the second scan terminal S2 are coupled to the same scan signal line. The scan signal lines in the pixel circuit 10 can be reduced to include only one scan signal line, that is, one row of pixel circuits 10 is controlled by only one scan signal line, so that the number of scan signal lines in the display panel is reduced and the driver circuit in the display panel which is connected to the original scan signal line and configured to provide the signal for the scan signal line is omitted. In this manner, the bezel size of the display panel can be reduced while the layout size of the pixel circuit is reduced, which is conducive to achieving the narrow bezel of the display panel.

In other embodiments, optionally, the fourth scan terminal and the first scan terminal are coupled to the same scan signal line, or the fourth scan terminal and the second scan terminal are coupled to the same scan signal line, or at least two ports of the first scan terminal, the second scan terminal, the third scan terminal and the fourth scan terminal are coupled to the same scan signal line.

Figure 15:
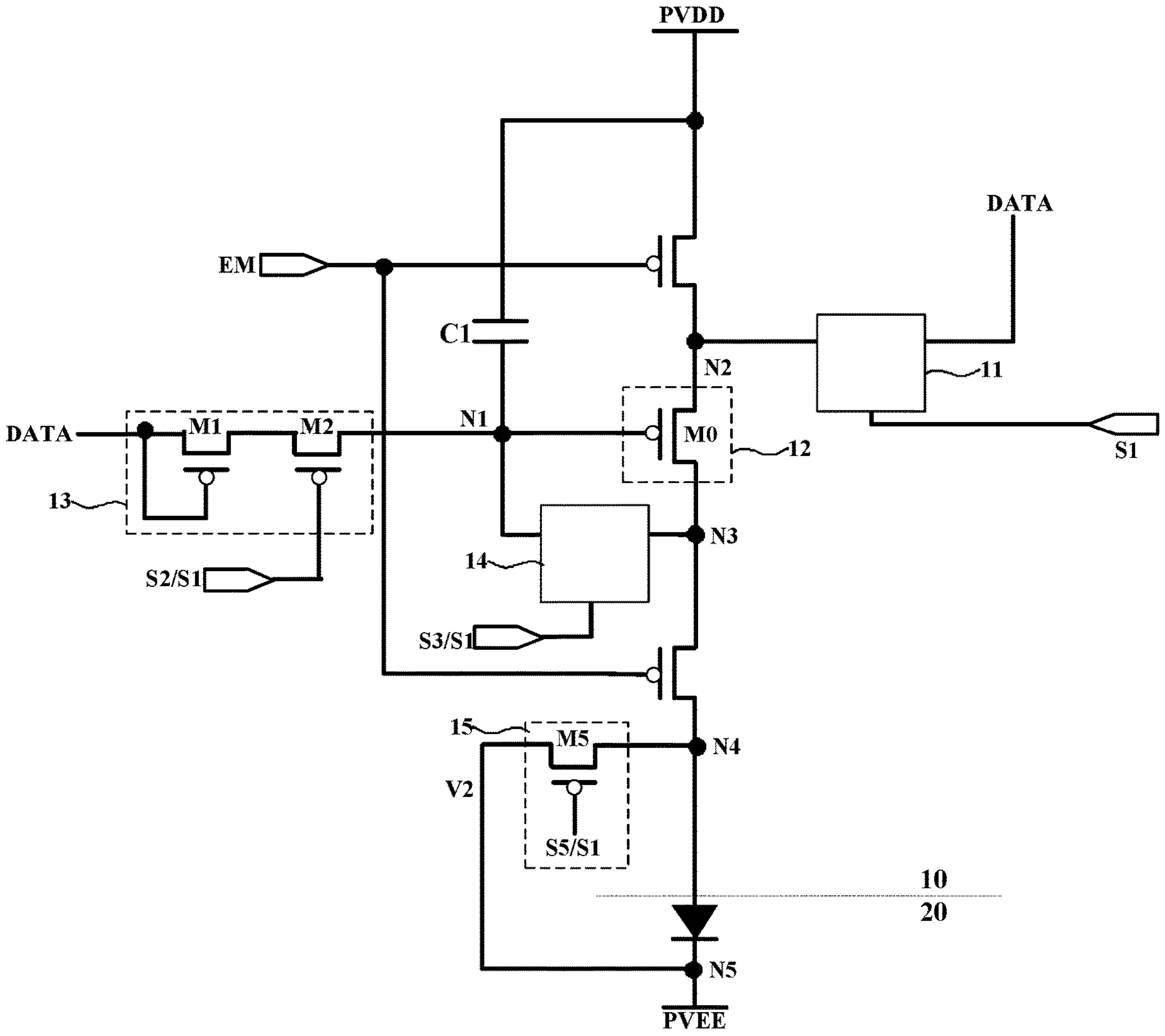
FIG. 15 is a schematic diagram of another pixel circuit according to an embodiment of the present disclosure.

FIG. 15 is a schematic diagram of another pixel circuit according to an embodiment of the present disclosure. Optionally, the second signal terminal V2 is connected to a second electrode N5 of the light-emitting element 20 and the second reset module 15 includes a fifth reset transistor M5, an input terminal of the fifth reset transistor M5 is connected to the second electrode N5 of the light-emitting element 20, an output terminal of the fifth reset transistor M5 is connected to the first electrode N4 of the light-emitting element 20, a gate of the fifth reset transistor M5 is connected to a fifth scan terminal S5, and the fifth scan terminal S5, the first scan terminal S1 and the second scan terminal S2 are coupled to the same scan signal line.

In the present embodiment, the fifth reset transistor M5 is connected between the first electrode N4 and the second electrode N5 of the light-emitting element 20, the fifth scan terminal S5 is connected to the gate of the fifth reset transistor M5, and a scan signal provided by the fifth scan terminal S5 controls an on or off state of the fifth reset transistor M5. The first electrode N4 of the light-emitting element 20 is coupled to the output terminal N3 of the drive transistor M0, and the second electrode N5 of the light-emitting element 20 is connected to a second power terminal PVEE, and a voltage of the second power terminal PVEE is relatively low. When the scan signal provided by the fifth scan terminal S5 controls the fifth reset transistor M5 to turn on, the low voltage provided by the second power terminal PVEE is transmitted to the first electrode N4 of the light-emitting element 20 to achieve the voltage regulation of the first electrode N4 of the light-emitting element 20. When the scan signal provided by the fifth scan terminal S5 controls the fifth reset transistor M5 to cut off, the light-emitting element 20 works normally.

The voltage of the second power terminal PVEE also serves as the reset voltage, and thus the reference voltage line required by the second reset module 15 does not need to be disposed in the display panel. In this manner, the number of signal lines in the display panel can be reduced, which is conducive to achieving the narrow bezel of the display panel while the layout size of the pixel circuit is reduced.

The fifth scan terminal S5, the first scan terminal S1 and the second scan terminal S2 are coupled to the same scan signal line. For example, the first scan terminal S1 to the fifth scan terminal S5 are all coupled to the same scan signal line so that the scan signal lines in the pixel circuit 10 can be reduced to include only one scan signal line, that is, one row of pixel circuits 10 is controlled by only one scan signal line, and thus the number of scan signal lines in the display panel is reduced and the driver circuit in the display panel which is connected to the original scan signal line and configured to provide the signal for the scan signal line is omitted. In this manner, the bezel size of the display panel can be reduced while the layout size of the pixel circuit is reduced, which is conducive to achieving the narrow bezel of the display panel.

In other embodiments, optionally, the fifth scan terminal and the first scan terminal are coupled to the same scan signal line, or the fifth scan terminal and the second scan terminal are coupled to the same scan signal line, or at least two ports of the first scan terminal to the fifth scan terminal are coupled to the same scan signal line.

For the display panel described in any one of the preceding embodiments, optionally, a working process of the pixel circuit includes a first reset stage, a data write stage and a light emission stage, and the data write stage is located between the first reset stage and the light emission stage. At the first reset stage, the first reset module transmits the signal of the first signal line to the gate of the drive transistor. At the data write stage, the data write module transmits the signal of the first signal line to the input terminal of the drive transistor. At the light emission stage, the first reset module is turned off, and the data write module is turned off. A first reset stage of a pixel circuit in a current row is located after a data write stage of a pixel circuit in a previous row.

Here, the pixel circuit shown in FIG. 13 is used as an example. Optionally, the first signal line DATA provides the first reset signal for the first reset module 13, the second reset signal for the second reset module 15 and the data signal for the data write module 11. The first scan terminal S1 to the fourth scan terminal S4 are all coupled to the same scan signal line.

Figure 16:
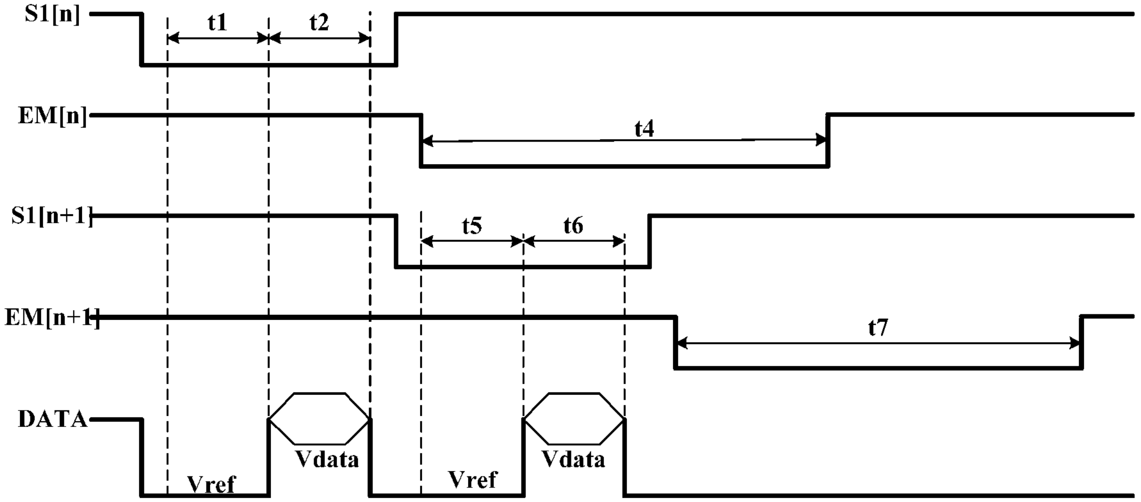
FIG. 16 is a timing diagram of the pixel circuit in FIG. 13.

FIG. 16 is a timing diagram of the pixel circuit in FIG. 13. As shown in FIG. 16, a working process of a pixel circuit 10 in an n-th row includes a first reset stage t1, a data write stage t2 and a light emission stage t4, and optionally, the data write stage t2 is located between the first reset stage t1 and the light emission stage t4. A working process of a pixel circuit 10 in an (n+1)-th row includes a first reset stage t5, a data write stage t6 and a light emission stage t7, and optionally, the data write stage t6 is located between the first reset stage t5 and the light emission stage t7.

At the first reset stage t1 of the pixel circuit 10 in the n-th row, a scan signal provided by a first scan terminal S1[*n*] of the pixel circuit 10 in the n-th row is an effective pulse, which can control the data write module 11, and the second reset transistor M2, the compensation module 14 and the fourth reset transistor M4 to turn on at the same time; the first signal line DATA provides the first reset signal Vref, which can control the first reset transistor M1 and the third reset transistor M3 to turn on at the same time. Based on this, the first reset signal Vref is written to the input terminal N2 of the drive transistor M0 through the data write module 11, the first reset signal Vref is written to the gate N1 of the drive transistor M0 through the first reset module 13, the compensation module 14 is turned on so that the first reset signal Vref is transferred from the gate N1 of the drive transistor M0 to the output terminal N3 of the drive transistor M0, and the first reset signal Vref is written to the first electrode N4 of the light-emitting element 20 through the second reset module 15. Thus, the three terminals of the drive transistor M0 of the pixel circuit 10 in the n-th row are reset, and the first electrode N4 of the light-emitting element is reset.

At the data write stage t2 of the pixel circuit 10 in the n-th row, the scan signal provided by the first scan terminal S1[*n*] is the effective pulse, which can control the data write module 11, the second reset transistor M2, the compensation module 14 and the fourth reset transistor M4 to turn on at the same time; and the first signal line DATA provides the data signal Vdata, which can control the first reset transistor M1 and the third reset transistor M3 to cut off at the same time. Based on this, the data signal Vdata is written to the input terminal N2 of the drive transistor M0 through the data write module 11, the first reset module 13 is cut off to avoid the data signal Vdata being written to the gate N1 of the drive transistor M0, and the second reset module 15 is cut off to avoid the data signal Vdata being written to the first electrode N4 of the light-emitting element 20. The data writing to the drive transistor M0 is achieved.

At the light emission stage t4 of the pixel circuit 10 in the n-th row, the scan signal provided by the first scan terminal S1[*n*] is an ineffective pulse, which can control the data write module 11, the second reset transistor M2, the compensation module 14 and the fourth reset transistor M4 to cut off at the same time; and a light emission control signal provided by a light emission control signal line EM[n] of the pixel circuit 10 in the n-th row is an effective pulse, which can control a light emission control module 16 to turn on, and the drive module 12 provides the drive current for the light-emitting element 20 so that the light-emitting element 20 emits light.

Optionally, the first reset stage t5 of the pixel circuit in the (n+1)-th row is located after the data write stage t2 of the pixel circuit in the n-th row. The first signal line DATA is connected to each pixel circuit 10 in one column. Therefore, the signals provided by the first signal line DATA may be provided for the pixel circuit 10 in the n-th row and the pixel circuit 10 in the (n+1)-th row at the same time. The pixel circuit 10 in the n-th row may perform the first reset stage t1 and the data write stage t2 before the pixel circuit 10 in the (n+1)-th row. Therefore, the data write stage t2 of the pixel circuit 10 in the n-th row is before the first reset stage t5 of the pixel circuit 10 in the (n+1)-th row. The working process of the pixel circuit in the (n+1)-th row is similar to that of the pixel circuit in the n-th row, where S1[*n*+1] is a first scan terminal of the pixel circuit in the (n+1)-th row, and EM[n+1] is a light emission control signal line of the pixel circuit in the (n+1)-th row.

It is to be noted that the reset voltage required by the pixel circuit is generally a constant value so that the voltage of the first reset signal Vref provided by the first signal line DATA is represented in FIG. 16 by a horizontal line, for example, the first reset signal Vref is −5 V. However, a data voltage required by the pixel circuit is generally a variable value. The display panel provides a data voltage of a corresponding grayscale for the pixel circuit according to a displayed image, and a range of the data voltage may be 0 to 5 V, so that a data voltage of the data signal Vdata provided by the first signal line DATA may be represented in FIG. 16 by a regular hexagon.

Referring to FIGS. 13 and 16, the pixel circuit 10 further includes a light emission control module 16, and the light emission control module 16 is separately connected to the drive transistor M0 and the light-emitting element 20 in series and configured to control whether the drive current flows through the light-emitting element 20; and a working process of the pixel circuit 10 includes a light emission stage t4, and at the light emission stage t4, the light emission control module 16 enables a path between the drive transistor M0 and the light-emitting element 20 to be conductive in response to a light emission control signal of a light emission control signal line EM.

In the present embodiment, the pixel circuit 10 further includes the light emission control module 16, and the light emission control module 16 includes a first light-emitting transistor M6 and a second light-emitting transistor M7. An input terminal of the first light-emitting transistor M6 is connected to a first power terminal PVDD, an output terminal of the first light-emitting transistor M6 is connected to the input terminal N2 of the drive transistor M0, and a gate of the first light-emitting transistor M6 is connected to the light emission control signal line EM. An input terminal of the second light-emitting transistor M7 is connected to the output terminal N3 of the drive transistor M0, an output terminal of the second light-emitting transistor M7 is connected to the first electrode N4 of the light-emitting element 20, and a gate of the second light-emitting transistor M7 is connected to the light emission control signal line EM.

The light emission control signal provided by the light emission control signal line EM is a pulse signal for controlling an on or off state of the light emission control module 16.

When the light emission control signal provided by the light emission control signal line EM is an ineffective pulse, the first light-emitting transistor M6 and the second light-emitting transistor M7 are turned off at the same time, and the pixel circuit 10 works at a pre-stage. At the pre-stage, the path between the drive transistor M0 and the light-emitting element 20 is not conductive so that the drive current will not flow through the light-emitting element 20. The pre-stage includes at least the first reset stage t1 and the data write stage t2.

When the light emission control signal provided by the light emission control signal line EM is an effective pulse, the first light-emitting transistor M6 and the second light-emitting transistor M7 are turned on at the same time, and the pixel circuit 10 works at the light emission stage t4. At the light emission stage t4, the path between the drive transistor M0 and the light-emitting element 20 is conductive so that the drive current flows through the light-emitting element 20.

In the present embodiment, the compensation module 14 includes a compensation transistor M8, and the data write module 11 includes a data write transistor M9. Optionally, the drive transistor M0, the first reset transistor M1, the second reset transistor M2, the third reset transistor M3, the fourth reset transistor M4, the first light-emitting transistor M6, the second light-emitting transistor M7, the compensation transistor M8 and the data write transistor M9 are all p-type transistors. However, it is not limited thereto.

In other embodiments, optionally, both the first reset transistor and the third reset transistor in the pixel circuit are n-type transistors or p-type transistors; or optionally, both the first light-emitting transistor and the second light-emitting transistor are n-type transistors or p-type transistors; or in the case where the first scan terminal, the second scan terminal, the third scan terminal and the fourth scan terminal do not share the scan signal line, one or more of the drive transistor, the data write transistor, the second reset transistor, the compensation transistor and the fourth reset transistor may be an n-type transistor or a p-type transistor. A type of each transistor in the pixel circuit may change as a pixel circuit structure changes, which is not specifically limited.

Figure 17:
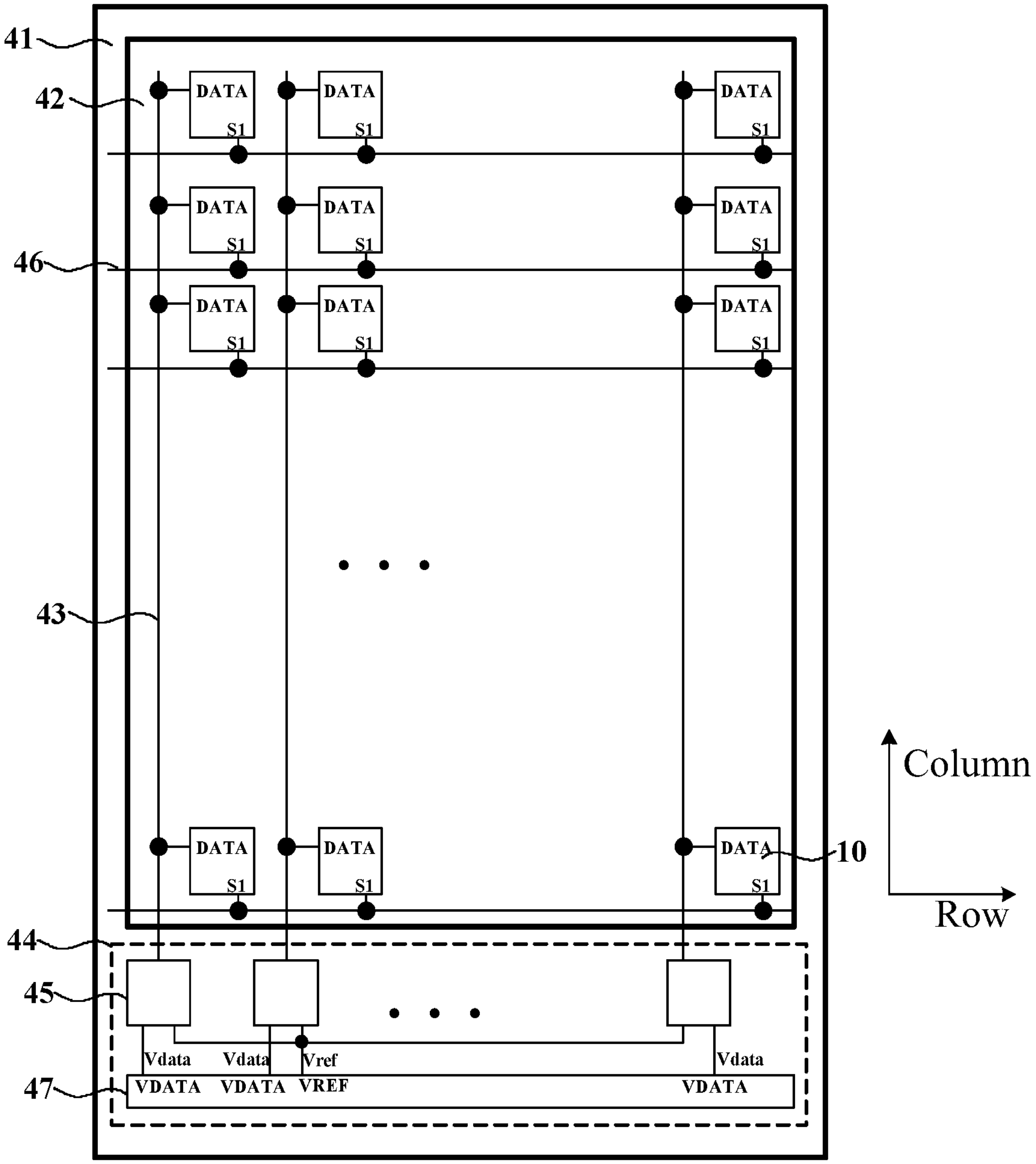
FIG. 17 is a schematic diagram of another display panel according to an embodiment of the present disclosure.

FIG. 17 is a schematic diagram of another display panel according to an embodiment of the present disclosure. Optionally, the display panel includes a first region 41 and a second region 42; the second region 42 includes N first signal lines 43, where N is a positive integer; and the first region 41 includes a first driver circuit 44, the first driver circuit 44 includes N first drive units 45, an output terminal of one of the N first drive units 45 is correspondingly connected to one of the N first signal lines 43, a first input terminal of the first drive unit 45 receives the first reset signal Vref, and a second input terminal of the first drive unit 45 receives the data signal Vdata. At the first reset stage, a first input terminal of the first drive unit 45 is connected to an output terminal of the first drive unit 45; at the data write stage, a second input terminal of the first drive unit 45 is connected to an output terminal of the first drive unit 45. In the present embodiment, the display panel includes the first region 41 and the second region 42, and optionally, the second region 42 is a display region and the first region 41 is a non-display region located on the periphery of the display region.

The second region 42 includes a plurality of pixel circuits 10, N first signal lines 43 and a plurality of scan signal lines 46, the first signal line 43 is a data line, one of the N first signal lines 43 is electrically connected to one column of pixel circuits 10, and one of the plurality of scan signal lines 46 is electrically connected to one row of pixel circuits 10. The first signal line 43 provides a data signal for the pixel circuit 10 and also serves as a reference voltage line for providing a reset signal for the pixel circuit 10. The scan signal line 46 provides a scan signal for the pixel circuit 10, and optionally, a plurality of scan terminals in the pixel circuit 10 are coupled to the same scan signal line 46 and one row of pixel circuits 10 includes only one scan signal line 46.

The first region 41 includes a first driver circuit 44, the first driver circuit 44 includes N first drive units 45, an output terminal of one of the N first drive units 45 is correspondingly connected to one of the N first signal lines 43, a first input terminal of the first drive unit 45 receives the first reset signal Vref, and a second input terminal of the first drive unit 45 receives the data signal Vdata. At the first reset stage, a first input terminal of the first drive unit 45 is connected to an output terminal of the first drive unit 45 so that the first reset signal Vref is transmitted to the first signal line 43 through the first drive unit 45, and with the cooperation of the scan signal line 46, the first signal line 43 transmits the first reset signal Vref to a gate of a drive transistor of the pixel circuit 10. At the data write stage, a second input terminal of the first drive unit 45 is connected to an output terminal of the first drive unit 45 so that the data signal Vdata is transmitted to the first signal line 43 through the first drive unit 45, and with the cooperation of the scan signal line 46, the first signal line 43 transmits the data signal Vdata to an input terminal of the drive transistor of the pixel circuit 10.

Referring to FIG. 17, optionally, the first driver circuit 44 includes a driver chip 47, where the driver chip 47 includes N data output terminals VDATA and at least one reset output terminal VREF; the first input terminal of the first drive unit 45 is connected to one of the at least one reset output terminal VREF, and a second input terminal of the first drive unit 45 is correspondingly connected to one of the N data output terminals VDATA. The driver chip 47 includes the at least one reset output terminal VREF, one reset output terminal VREF is disposed corresponding to one or more first drive units 45, the reset output terminal VREF is connected to a first input terminal of the corresponding first drive unit 45, and the reset output terminal VREF provides the first reset signal Vref for the first input terminal of the corresponding first drive unit 45. The driver chip 47 includes the N data output terminals VDATA, one data output terminal VDATA is disposed corresponding to one first drive unit 45, the data output terminal VDATA is connected to a second input terminal of the corresponding first drive unit 45, and the data output terminal VDATA provides the data signal Vdata for the second input terminal of the corresponding first drive unit 45.

Referring to FIG. 17, optionally, first input terminals of at least two of the N first drive units 45 are connected to the same reset output terminal VREF. One reset output terminal VREF in the driver chip 47 is disposed corresponding to a plurality of first drive units 45, the reset output terminal VREF is connected to first input terminals of the corresponding plurality of first drive units 45, and the reset output terminal VREF provides the first reset signals Vref for the first input terminals of the corresponding plurality of first drive units 45. The number of ports of the reset output terminals VREF in the driver chip 47 can be reduced, and the cost of the driver chip 47 can be reduced. If first input terminals of the N first drive units 45 are all connected to the same reset output terminal VREF, the cost of the driver chip 47 cost is further reduced.

Figure 18:
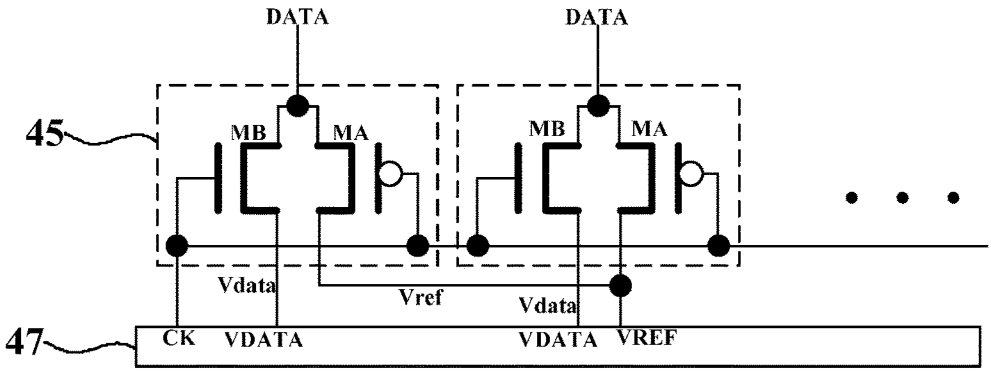
FIG. 18 is a schematic diagram of a first driver circuit according to an embodiment of the present disclosure.

FIG. 18 is a schematic diagram of a first driver circuit according to an embodiment of the present disclosure. As shown in FIG. 18, optionally, the first drive unit 45 includes a first switch MA and a second switch MB, the first switch MA is connected between one of the at least one reset output terminal VREF and one of the N first signal lines DATA, the second switch MB is connected between one of the N data output terminals VDATA and one of the N first signal lines DATA, and the first switch MA and the second switch MB are turned on at different times. Optionally, a control terminal of the first switch MA and a control terminal of the second switch MB are connected to the same switch control line CK and the first switch MA includes an p-type transistor and the second switch MB includes an n-type transistor. In other embodiments, optionally, the first switch includes an n-type transistor and the second switch includes a p-type transistor.

As shown in FIG. 18, in the first drive unit 45, an input terminal of the first switch MA is connected to the reset output terminal VREF, an output terminal of the first switch MA is connected to the first signal line DATA, and the control terminal of the first switch MA is connected to the switch control line CK. An input terminal of the second switch MB is connected to the data output terminal VDATA, an output terminal of the second switch MB is connected to the first signal line DATA, and the control terminal of the second switch MB is connected to the switch control line CK. The switch control line CK controls the first switch MA and the second switch MB in the first drive unit 45 to turn on at different times.

At the first reset stage, the switch control line CK controls the first switch MA in the first drive unit 45 to turn on and the second switch MB to cut off, and the first reset signal Vref provided by the reset output terminal VREF is transmitted to the first signal line DATA. Sequentially, at the data write stage, when the switch control line CK controls the second switch MB in the first drive unit 45 to turn on, the first switch MA is cut off, and the data signal Vdata provided by the data output terminal VDATA is transmitted to the first signal line DATA.

In the case where the first switch MA includes the p-type transistor and the second switch MB includes the n-type transistor, the switch control line CK outputs a low voltage to control the first switch MA in the first drive unit 45 to turn on and the second switch MB to cut off. Sequentially, the switch control line CK outputs a high voltage to control the second switch MB in the first drive unit 45 to turn on and the first switch MA to cut off.

Figure 19:
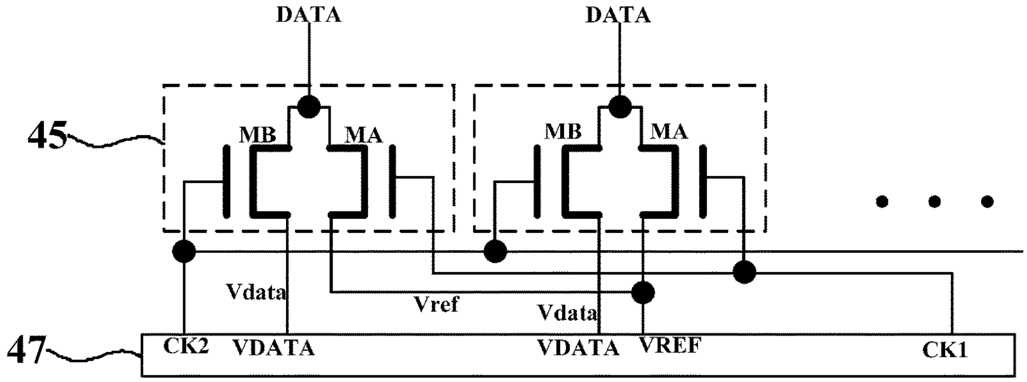
FIG. 19 is a schematic diagram of another first driver circuit according to an embodiment of the present disclosure.

FIG. 19 is a schematic diagram of another first driver circuit according to an embodiment of the present disclosure. FIG. 19 differs from FIG. 18 in that as shown in FIG. 19, optionally, a control terminal of the first switch MA and a control terminal of the second switch MB are connected to two different switch control lines. Optionally, the first switch MA includes an n-type transistor and the second switch MB includes an n-type transistor. In other embodiments, optionally, the first switch includes a p-type transistor, or the second switch includes a p-type transistor.

As shown in FIG. 19, in the first drive unit 45, the control terminal of the first switch MA is connected to a first switch control line CK1, and the control terminal of the second switch MB is connected to a second switch control line CK2. The first switch control line CK1 separately controls an on or off state of the first switch MA, and the second switch control line CK2 separately controls an on or off state of the second switch MB.

At the first reset stage, the first switch control line CK1 controls the first switch MA to turn on, the second switch control line CK2 controls the second switch MB to cut off, and the first reset signal Vref provided by the reset output terminal VREF is transmitted to the first signal line DATA. Sequentially, at the data write stage, the second switch control line CK2 controls the second switch MB to turn on, the first switch control line CK1 controls the first switch MA to cut off, and the data signal Vdata provided by the data output terminal VDATA is transmitted to the first signal line DATA.

Figure 20:
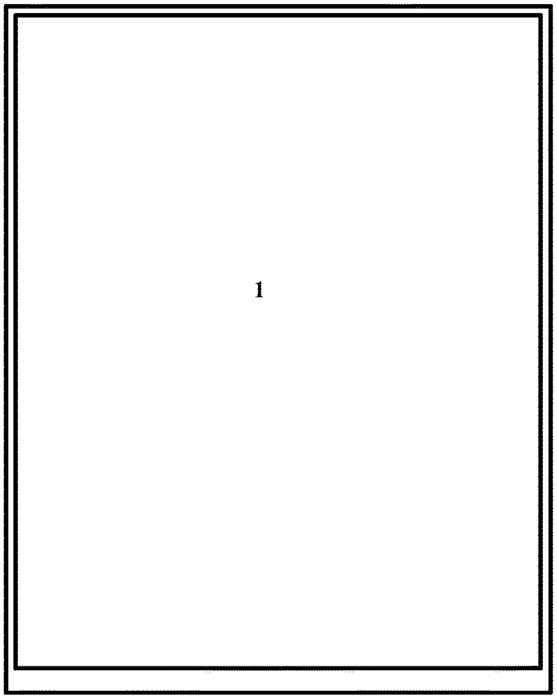
FIG. 20 is a schematic diagram of a display device according to an embodiment of the present disclosure.

Based on the same inventive concept, embodiments of the present disclosure further provide a display device. The display device includes the preceding display panel. Optionally, the display panel is an organic light-emitting display panel or a micro light-emitting diode (LED) display panel. FIG. 20 is a schematic diagram of a display device according to an embodiment of the present disclosure. As shown in FIG. 20, optionally, the display device is applied to an electronic device 1 such as a smartphone or a tablet computer. It is to be understood that the preceding embodiments merely provide some examples of the pixel circuit structures, and the display panel further includes other structures, which will not be repeated herein.

In the present embodiment, the data signal line providing the signal line is the first signal line and also serves as the reference voltage line for providing the first reset signal for the first reset module so that the reference voltage line does not need to be disposed in the display panel, thereby reducing the number of signal lines in the display panel. A plurality of scan terminals in the pixel circuit may be coupled to the same scan signal line so that the number of scan signal lines required by the pixel circuit is further reduced and the number of scan signal lines required by the pixel circuit can be reduced to one scan signal line. In this manner, it is conducive to achieving the narrow bezel of the display panel while the layout size of the pixel circuit is reduced. In addition, the number of signal lines required by the pixel circuit is reduced so that the transmittance of the display panel can be improved, which is conducive to the application of the display panel to the transparent display.

The preceding embodiments do not limit the scope of the present disclosure. It is to be understood by those skilled in the art that various modifications, combinations, sub-combinations, and substitutions may be performed according to design requirements and other factors. Any modification, equivalent substitution, improvement, or the like made within the spirit and principle of the present disclosure is within the scope of the present disclosure.

What is claimed is:

1. A display panel, comprising:

a pixel circuit and a light-emitting element, wherein the pixel circuit comprises a data write module, a drive module and a first reset module, wherein the data write module is configured to transmit a data signal in response to a scan signal of a first scan terminal;

the drive module is configured to provide a drive current for the light-emitting element and comprises a drive transistor, wherein the drive transistor is configured to generate the drive current according to the data signal transmitted by the data write module;

the first reset module is connected between a first signal line and a gate of the drive transistor and configured to transmit a signal of the first signal line to the gate of the drive transistor; and the data write module is connected between the first signal line and an input terminal of the drive transistor;

wherein the first reset module comprises a first reset transistor, wherein a gate of the first reset transistor is connected to an input terminal of the first reset transistor;

wherein the first reset module further comprises a second reset transistor, wherein the second reset transistor and the first reset transistor are connected in series and a gate of the second reset transistor is connected to a second scan terminal; and wherein the second scan terminal and the first scan terminal are coupled to a same scan signal line.

2. The display panel according to claim 1, wherein a working process of the pixel circuit comprises a first reset stage and a data write stage, wherein at the first reset stage, the first signal line provides a first reset signal; and at the data write stage, the first signal line provides the data signal.

3. The display panel according to claim 2, wherein a voltage of the data signal is greater than a voltage of the first reset signal.

4. The display panel according to claim 2, wherein an enable period of the scan signal of the first scan terminal comprises the first reset stage and the data write stage.

5. The display panel according to claim 2, further comprising:

a first region and a second region, wherein the second region comprises N first signal lines, wherein N is a positive integer;

the first region comprises a first driver circuit, wherein the first driver circuit comprises N first drive units, wherein an output terminal of a first drive unit of the N first drive units is correspondingly connected to a first signal line of the N first signal lines, a first input terminal of the first drive unit receives the first reset signal, and a second input terminal of the first drive unit receives the data signal;

at the first reset stage, the first input terminal of the first drive unit and the output terminal of the first drive unit are conductive; and at the data write stage, the second input terminal of the first drive unit and the output terminal of the first drive unit are conductive.

6. The display panel according to claim 5, wherein the first driver circuit comprises a driver chip, and the driver chip comprises N data output terminals and at least one reset output terminal, wherein the first input terminal of the first drive unit is connected to a reset output terminal of the at least one reset output terminal, and the second input terminal of the first drive unit is correspondingly connected to a data output terminal of the N data output terminals;

first input terminals of at least two first drive units of the N first drive units are connected to a same reset output terminal of the at least one reset output terminal; and the first drive unit comprises a first switch and a second switch, wherein the first switch is connected between the reset output terminal and the first signal line; the second switch is connected between the data output terminal and the first signal line; and the first switch and the second switch are turned on at different times.

7. The display panel according to claim 1, wherein both the first reset transistor and the drive transistor are p-type transistors, or both the first reset transistor and the drive transistor are n-type transistors.

8. The display panel according to claim 1, wherein a working process of the pixel circuit comprises a first reset stage and a first non-reset stage, wherein at the first reset stage, the first signal line provides a first reset signal, and the first reset transistor is turned on; and at the first non-reset stage, the first signal line provides a first signal, and the first reset transistor is turned off.

9. The display panel according to claim 1, wherein the input terminal of the first reset transistor is connected to the first signal line, an output terminal of the first reset transistor is connected to an input terminal of the second reset transistor, and an output terminal of the second reset transistor is connected to the gate of the drive transistor; or the input terminal of the second reset transistor is connected to the first signal line, the output terminal of the second reset transistor is connected to the input terminal of the first reset transistor, and the output terminal of the first reset transistor is connected to the gate of the drive transistor.

10. The display panel according to claim 1, wherein the pixel circuit further comprises a compensation module, wherein the compensation module is connected between the gate of the drive transistor and an output terminal of the drive transistor, and a control terminal of the compensation module is connected to a third scan terminal; and the third scan terminal and the first scan terminal are coupled to a same scan signal line; the third scan terminal and the second scan terminal are coupled to a same scan signal line; or the third scan terminal, the first scan terminal and the second scan terminal are coupled to a same scan signal line.

11. The display panel according to claim 1, wherein a working process of the pixel circuit comprises a first reset stage, a data write stage and a light emission stage, wherein the data write stage is located between the first reset stage and the light emission stage, wherein at the first reset stage, the first reset module transmits the signal of the first signal line to the gate of the drive transistor;

at the data write stage, the data write module transmits the signal of the first signal line to the input terminal of the drive transistor;

at the light emission stage, the first reset module is turned off, and the data write module is turned off; and a first reset stage of a pixel circuit in a current row is located after a data write stage of a pixel circuit in a previous row.

12. The display panel according to claim 1, wherein the pixel circuit further comprises a light emission control module, wherein the light emission control module is connected to the drive transistor and the light-emitting element in series and configured to control whether the drive current flows through the light-emitting element; and a working process of the pixel circuit comprises a light emission stage, wherein at the light emission stage, the light emission control module enables a path between the drive transistor and the light-emitting element to be conductive in response to a light emission control signal of a light emission control signal line.

13. A display panel, comprising:

a pixel circuit and a light-emitting element, wherein the pixel circuit comprises a data write module, a drive module and a first reset module, wherein the data write module is configured to transmit a data signal in response to a scan signal of a first scan terminal;

the drive module is configured to provide a drive current for the light-emitting element and comprises a drive transistor, wherein the drive transistor is configured to generate the drive current according to the data signal transmitted by the data write module;

the first reset module is connected between a first signal line and a gate of the drive transistor and configured to transmit a signal of the first signal line to the gate of the drive transistor; and the data write module is connected between the first signal line and an input terminal of the drive transistor;

wherein the first reset module comprises a first reset transistor, wherein a gate of the first reset transistor is connected to an input terminal of the first reset transistor;

wherein the first reset module further comprises a second reset transistor, wherein the second reset transistor and the first reset transistor are connected in series and a gate of the second reset transistor is connected to a second scan terminal;

wherein the pixel circuit further comprises a second reset module, wherein the second reset module is connected between a second signal terminal and a first electrode of the light-emitting element and configured to transmit a signal of the second signal terminal to the first electrode of the light-emitting element; and an output terminal of the drive transistor is coupled to the first electrode of the light-emitting element; and wherein the second signal terminal is coupled to the first signal line; and the second reset module comprises a third reset transistor and a fourth reset transistor which are connected in series, wherein a gate of the third reset transistor is connected to an input terminal of the third reset transistor, and a gate of the fourth reset transistor is connected to a fourth scan terminal.

14. The display panel according to claim 13, wherein the fourth scan terminal and the first scan terminal are coupled to a same scan signal line; the fourth scan terminal and the second scan terminal are coupled to a same scan signal line; or the fourth scan terminal, the first scan terminal and the second scan terminal are coupled to a same scan signal line; and both the third reset transistor and the first reset transistor are p-type transistors; or both the third reset transistor and the first reset transistor are n-type transistors.

15. The display panel according to claim 13, wherein the second signal terminal is connected to a second electrode of the light-emitting element;

the second reset module comprises a fifth reset transistor, wherein an input terminal of the fifth reset transistor is connected to the second electrode of the light-emitting element, an output terminal of the fifth reset transistor is connected to the first electrode of the light-emitting element, and a gate of the fifth reset transistor is connected to a fifth scan terminal; and the fifth scan terminal and the first scan terminal are coupled to a same scan signal line; the fifth scan terminal and the second scan terminal are coupled to a same scan signal line; or the fifth scan terminal, the first scan terminal and the second scan terminal are coupled to a same scan signal line.

16. A display device, comprising a display panel, wherein the display panel comprises:

a pixel circuit and a light-emitting element, wherein the pixel circuit comprises a data write module, a drive module and a first reset module, wherein the data write module is configured to transmit a data signal in response to a scan signal of a first scan terminal;

the drive module is configured to provide a drive current for the light-emitting element and comprises a drive transistor, wherein the drive transistor is configured to generate the drive current according to the data signal transmitted by the data write module;

the first reset module is connected between a first signal line and a gate of the drive transistor and configured to transmit a signal of the first signal line to the gate of the drive transistor; and the data write module is connected between the first signal line and an input terminal of the drive transistor;

wherein the first reset module comprises a first reset transistor, wherein a gate of the first reset transistor is connected to an input terminal of the first reset transistor;

wherein the first reset module further comprises a second reset transistor, wherein the second reset transistor and the first reset transistor are connected in series and a gate of the second reset transistor is connected to a second scan terminal; and wherein the second scan terminal and the first scan terminal are coupled to a same scan signal line.

17. The display device according to claim 16, wherein a working process of the pixel circuit comprises a first reset stage and a data write stage, wherein at the first reset stage, the first signal line provides a first reset signal; and at the data write stage, the first signal line provides the data signal.

18. The display device according to claim 17, wherein an enable period of the scan signal of the first scan terminal comprises the first reset stage and the data write stage.

19. The display device according to claim 17, wherein a voltage of the data signal is greater than a voltage of the first reset signal.

20. The display device according to claim 16, wherein both the first reset transistor and the drive transistor are p-type transistors, or both the first reset transistor and the drive transistor are n-type transistors.

* * * * *